(12) United States Patent
Yoshida

(10) Patent No.: US 9,703,150 B2
(45) Date of Patent: Jul. 11, 2017

(54) LIQUID CRYSTAL DISPLAY DEVICE

(71) Applicant: Sharp Kabushiki Kaisha, Osaka-shi, Osaka (JP)

(72) Inventor: Masahiro Yoshida, Osaka-shi (JP)

(73) Assignee: Sharp Kabushiki Kaisha, Sakai (JP)

( * ) Notice: Subject to any disclaimer, the term of this patent is extended or adjusted under 35 U.S.C. 154(b) by 459 days.

(21) Appl. No.: 14/357,809

(22) PCT Filed: Nov. 16, 2012

(86) PCT No.: PCT/JP2012/079764
§ 371 (c)(1),
(2) Date: May 13, 2014

(87) PCT Pub. No.: WO2013/077262
PCT Pub. Date: May 30, 2013

(65) Prior Publication Data
US 2014/0300852 A1    Oct. 9, 2014

(30) Foreign Application Priority Data

Nov. 25, 2011  (JP) .................................. 2011-257805

(51) Int. Cl.
*G02F 1/1345* (2006.01)
*G02F 1/1343* (2006.01)
*G02F 1/1339* (2006.01)

(52) U.S. Cl.
CPC ...... *G02F 1/134336* (2013.01); *G02F 1/1339* (2013.01); *G02F 1/13452* (2013.01);
(Continued)

(58) Field of Classification Search
CPC ............. G02F 1/134336; G02F 1/1339; G02F 1/134363
(Continued)

(56) References Cited

U.S. PATENT DOCUMENTS

2002/0171798 A1  11/2002  Tanaka et al.
2008/0024416 A1   1/2008  Onogi et al.
(Continued)

FOREIGN PATENT DOCUMENTS

JP  2003-015547 A  1/2003
JP  2008-032899 A  2/2008
(Continued)

OTHER PUBLICATIONS

Official Communication issued in International Patent Application No. PCT/JP2012/079764, mailed on Feb. 19, 2013.
(Continued)

*Primary Examiner* — Lucy Chien

(74) *Attorney, Agent, or Firm* — Keating & Bennett, LLP

(57) ABSTRACT

The present invention provides a liquid crystal display device which can be miniaturized while preventing display defects such as flicker. The present invention relates to a liquid crystal display device including a wiring connected to an electrode to supply a common signal. The electrode includes a first electrode portion formed in a transparent conductive layer. The wiring is formed outside a display region and includes at least one of the first wiring portion and a second wiring portion and a third wiring portion facing the at least one of the first wiring portion and the second wiring portion. The first wiring portion, the second wiring portion, and the third wiring portion are respectively formed in a first conductive layer, a second conductive layer, and a third conductive layer.

13 Claims, 18 Drawing Sheets

(52) U.S. Cl.
CPC ............... *G02F 1/134363* (2013.01); *G02F 2001/13456* (2013.01)

(58) Field of Classification Search
USPC ........................................... 349/151
See application file for complete search history.

(56) References Cited

U.S. PATENT DOCUMENTS

2009/0323005 A1   12/2009   Ota
2012/0313845 A1   12/2012   Onogi et al.

FOREIGN PATENT DOCUMENTS

| JP | 2008-192668 A | 8/2008 |
| JP | 2010-008758 A | 1/2010 |
| JP | 2010-169804 A | 8/2010 |

OTHER PUBLICATIONS

Yoshida, "Liquid Crystal Display Device", U.S. Appl. No. 15/446,072, filed Mar. 1, 2017.

LIQUID CRYSTAL DISPLAY DEVICE

TECHNICAL FIELD

The present invention relates to a liquid crystal display device. Specifically, the present invention relates to a liquid crystal display device suitable for a liquid display device including an electrode to supply a common signal to a plurality of pixels, such as a liquid crystal display device of which the liquid crystal alignment mode utilizes a lateral electric field.

BACKGROUND ART

Liquid crystal display devices have been widely used these days in various applications such as televisions and personal computers. In order to control driving of display, the liquid crystal device includes many electronic parts, which integrally make up one module. In such liquid crystal display devices, typically, an integrated circuit (IC) controls input display signals, and images are displayed on the liquid crystal display panel based on the controlled signals. Recently, demand for miniaturized liquid crystal display panels with excellent display qualities has been increasing with increasing use of mobile devices such as cellular phones and digital cameras.

In typical liquid crystal display panels, an electrode (hereinafter, also referred to as signal supply electrode) to supply a common signal to a plurality of pixels is formed. A wiring (hereinafter, also referred to as common trunk wiring) formed outside the display region supplies potential to such an electrode. Known liquid crystal display panels with such an electrode and a wiring include a fringe field switching (FFS) mode liquid crystal display device including a peripheral common potential line formed along the periphery of the display region and a common electrode connected to the peripheral common potential line (see Patent Literature 1, for example); and a FFS mode liquid crystal display panel including a common wiring formed along the periphery of the display region and a common electrode electrically connected to the common wiring (see Patent Literature 2, for example).

CITATION LIST

Patent Literature

Patent Literature 1: JP 2008-32899 A
Patent Literature 2: JP 2010-8758 A

SUMMARY OF INVENTION

Technical Problem

In conventional liquid crystal display devices, miniaturization of the liquid crystal display panel (miniaturization of the frame) causes display defects such as flicker.

The signal supply electrode in the liquid crystal display panel is typically formed in the display region. In order to prevent reduction in the transmissivity of the liquid crystal display panel, the signal supply electrode is formed from a transparent conductive film material such as indium tin oxide (ITO) and indium zinc oxide (IZO). Such a signal supply electrode formed from a transparent conductive film material has larger electric resistance than a metal wiring, and thus tends to cause a large variation in delay of the signal supplied to the plurality of pixels in plane. Therefore, a common trunk wiring, which serves as a path transmitting signals to the signal supply electrode, preferably has a small electric resistance. However, reduction in the size of the frame region for miniaturizing the display panel results in reduction in the width of the common trunk wiring, which may cause display defects such as flicker.

In FFS mode liquid crystal display panels, slit are typically formed in either one of a pixel electrode and a common electrode that is one type of signal supply electrode, so that a lateral electric field is produced. However, in the case that the slits are formed in the common electrode, variation in signal delay tends to be large. If such a FFS mode liquid crystal display panel including a common electrode with slits is miniaturized, the display defects described above are more likely to occur. In the case that the slits are formed in the common electrode, an alignment film formed on the common electrode may be subjected to a rubbing treatment to align the liquid crystal molecules when no electric field is applied. In order to prevent rubbing defects caused by steps in the slit portion of the common electrode, the common electrode preferably has a small film thickness. However, the common electrode having a small film thickness tends to have a large resistance. If a FFS mode liquid crystal display panel which includes a common electrode with slits and a rubbing-treated alignment film on the common electrode is miniaturized, the display defects are even more likely to occur.

Patent Literature 1 discloses that, on a TFT substrate, the edge of the common electrode formed of a transparent electrode is arranged along the outer periphery of the display region, and that the edge is connected to the peripheral common potential line formed from a metal or the like. Thus, if the width of the peripheral common potential line is narrowed to miniaturize the display panel, the peripheral common potential line may have a larger electric resistance, which may cause display defects.

Patent Literature 2 discloses that, in order to reduce the resistance of the common electrode formed from a transparent conductive material, a conductive layer which is more conductive than the transparent conductive material is formed on the surface of the common electrode or between the common electrode and an interelectrode insulating film. However, Patent Literature 2 teaches nothing about the common wiring, which is formed along the outer periphery of the display region and is connected to the common electrode, except that it is formed from a metal material. If the width of this common wiring is reduced for miniaturization, display defects presumably occur as in the case of Patent Literature 1.

Thus, even if the techniques of Patent Literatures 1 and 2 are used, the resistance of the common trunk wiring is not sufficiently reduced. It is therefore difficult to miniaturize the outer shape of the liquid crystal display panel.

In view of the current state of the art described above, the present invention is devised to provide a liquid crystal display device which can be miniaturized while preventing display defects such as flicker.

Solution to Problem

After various studies on liquid crystal display devices which can be miniaturized while preventing display defects such as flicker, the inventor focused on the structure of a wiring (common trunk wiring) which is connected to an electrode to supply a common signal to a plurality of pixels and formed outside the display region. The inventor found out that adding one conductive layer to the active matrix substrate, which typically has a laminated structure including at least three layers including a transparent conductive layer, and imparting a laminated structure to the common trunk wiring using the conductive layer added and the conductive layers other than the transparent conductive layer can increase the cross-sectional area of the common trunk wiring. The increase in the cross-sectional area prevents an increase in the electric resistance even if the width of the common trunk wiring is reduced for miniaturizing the frame region. Thus, the inventor found out that the common trunk wiring having a laminated structure enables reduction in the width of the common trunk wiring, and that the more the width of the wiring is reduced, the smaller the liquid crystal display panel can be. As a result, the present inventor has arrived at the solution to solve the problems, and completed the present invention.

That is, one aspect of the present invention is a liquid crystal display device (hereinafter, also referred to as liquid crystal display device according to the present invention) including an active matrix substrate and a plurality of pixels formed in a display region. The active matrix substrate includes a laminated structure including a plurality of conductive layers; an electrode to supply a common signal to the pixels; and a wiring formed outside the display region and connected to the electrode. The conductive layers include a first conductive layer; a second conductive layer on the first conductive layer; a third conductive layer on the second conductive layer; and a transparent conductive layer. The electrode includes a first electrode portion formed in the transparent conductive layer. The wiring includes at least one of a first wiring portion and a second wiring portion; and a third wiring portion facing the at least one of the first wiring portion and the second wiring portion. The first wiring portion, the second wiring portion, and the third wiring portion are formed in the first conductive layer, the second conductive layer, and the third conductive layer, respectively.

The liquid crystal display device according to the present invention is not particularly limited by other components as long as it essentially includes the above components.

The active matrix substrate herein refers to an insulating substrate (e.g., glass substrate) on which pixels each equipped with an active element are formed. The active element is not particularly limited, and a thin film transistor (TFT) is suitably used.

The plurality of conductive layers are typically produced in different steps. The arrangement of the transparent conductive layer is not particularly limited, and may be appropriately set. Typically, the transparent conductive layer is not arranged between the first conductive layer and the second conductive layer.

The application of the electrode, that is, the signal is not particularly limited and appropriately set depending on the conditions such as the mode and properties of the liquid crystal display device. The electrode is suitable as a common electrode or an auxiliary capacitance electrode.

The arrangement of the wiring is not particularly limited, and may be appropriately set in consideration of the conditions such as display qualities. Also, the arrangements of the first, second, and third wiring portions may be appropriately set in consideration of the conditions such as display qualities. Accordingly, the whole wiring may have a laminated structure, or only part of the wiring may have a laminated structure. In the latter case, the proportion (extent) of the part having a laminated structure may be appropriately set.

The liquid crystal display device according to the present invention can display any colors. For example, the device can display a black and white image, multicolor image, full color image, or the like. In the case of displaying full color images, the pixel typically includes sub pixels (dots) of different colors. Thus, the pixel can be read as "sub pixel".

In the following, preferable configurations of the liquid crystal display device according to the present invention are described. Here, the configurations of the liquid crystal display device of the present invention may be appropriately combined.

Preferably, the wiring includes the first wiring portion and the second wiring portion. The first wiring portion is preferably connected to the second wiring portion through the third wiring portion. This eliminates the need for forming a connecting electrode to connect the first wiring portion to the second wiring portion, reducing the number of steps and the cost.

A configuration (hereinafter, also referred to as a first configuration) in which the transparent conductive layer and the third conductive layer are adjacent to each other is preferred. This eliminates the need for performing a step of forming another layer such as an interlayer insulating film between a step of forming the transparent conductive layer and a step of forming the third conductive layer, reducing the number of steps and the costs. In addition, in this configuration, the transparent conductive layer can easily contact the third conductive layer, and thereby the third wiring portion can easily and reliably contact the first electrode portion. As a result, the wiring can be more easily and reliably connected to the electrode.

From this viewpoint, in the first configuration, the wiring is preferably connected to the electrode as a result of contact between the third wiring portion and the first electrode portion.

In the first configuration, the electrode preferably further includes a second electrode portion formed between adjacent pixels. Preferably, the second electrode portion is formed in the third conductive layer and connected to the third wiring portion. This makes the connection between the wiring and the electrode more reliable and increases the number of input paths for signals from the wiring, thus making the variation in signal delay less likely to occur in the electrode.

The third conductive layer preferably has a sheet resistance smaller than the transparent conductive layer. This allows the wiring to have a smaller electric resistance, thus further prevents display defects such as flicker and enables further miniaturization of the liquid crystal display device according to the present invention.

Another preferable configuration is a configuration (hereinafter, also referred to as a second configuration) in which the active matrix substrate further includes a first insulating film formed between the first conductive layer and the second conductive layer, and a second insulating film formed between the second conductive layer and the third conductive layer. If these insulating films are provided, the components which are formed in the first conductive layer, the second conductive layer, and the third conductive layer and not electrically connected to each other can be reliably isolated from each other.

In the second configuration, the wiring may include the first wiring portion, and the third wiring portion may contact the first wiring portion through a contact hole penetrating the first insulating film and the second insulating film. This allows the first wiring portion to be connected to the third wiring portion even if the first insulating film and the second insulating film are present.

In the second configuration, the wiring may include the second wiring portion, and the third wiring portion may contact the second wiring portion through a contact hole penetrating the second insulating film. This allows the second wiring portion to be connected to the third wiring portion even if the second insulating film is present.

The active matrix substrate preferably further includes a gate bus line and a source bus line each formed in the display region; and a lead-out wiring formed outside the display region and connected to the gate bus line or the source bus line (hereinafter, this configuration is also referred to as a third configuration). Preferably, the lead-out wiring intersects the wiring, and the wiring is constricted at an intersection of the wiring and the lead-out wiring. If the wiring is constricted, the region where the wiring and the lead-out wiring intersect can be smaller, decreasing parasitic capacity produced in the intersection.

For clarity, in the wiring including the lead-out wiring and the gate bus line or the source bus line, apart of the wiring in the display region is defined as the gate bus line or the source bus line, and a part of the wiring outside the display region is defined as the lead-out wiring, in the present description.

In the third configuration, preferably, the lead-out wiring is formed in the first conductive layer, and the wiring includes the second wiring portion. The second wiring portion is preferably constricted at an intersection of the second wiring portion and the lead-out wiring. This decreases the parasitic capacity produced between the wiring and the lead-out wiring in the case that the lead-out wiring is formed in the first conductive layer and the wiring includes the second wiring portion.

In the third configuration, preferably, the lead-out wiring is formed in the second conductive layer, the wiring includes the first wiring portion, and the first wiring portion and/or the third wiring portion are/is constricted at intersection(s) of the first wiring portion and/or the third wiring portion and the lead-out wiring (hereinafter, this configuration is also referred to as a forth configuration). This decreases the parasitic capacity produced between the wiring and the lead-out wiring in the case that the lead-out wiring is formed in the second conductive layer and the wiring includes the first wiring portion.

In the fourth configuration, a value calculated by dividing the relative permittivity of the second insulating film by the film thickness of the second insulating film is larger than a value calculated by dividing the relative permittivity of the first insulating film by the film thickness of the first insulating film. The third wiring portion is preferably constricted at an intersection of the third wiring portion and the lead-out wiring. By constricting the wiring portion facing the lead-out wiring with an insulating film therebetween in which the value calculated by dividing the relative permittivity of the film by the thickness of the film is large, the parasitic capacity produced between the wiring and the lead-out wiring is more effectively decreased.

From the same viewpoint, a value calculated by dividing the relative permittivity of the second insulating film by the film thickness of the second insulating film is preferably smaller than a value calculated by dividing the relative permittivity of the first insulating film by the film thickness of the first insulating film. The first wiring portion is preferably constricted at an intersection of the first wiring portion and the lead-out wiring.

Preferably, the electrode is a common electrode; the active matrix substrate further includes a pixel electrode; the common electrode includes a plurality of linear parts spaced apart from one another in each pixel; and the pixel electrode faces the space between the linear parts. In FFS mode liquid crystal display devices which include a common electrode having a slit (longitudinal aperture), variation in signal delay tends to increase in the common electrode. Therefore, the present invention may be more suitably used in liquid crystal display devices of this mode.

The common electrode refers to an electrode capable of producing an electric field between the common electrode and the pixel electrode. A so-called liquid crystal capacity is produced between the electrodes. That is, the electric field is produced in the liquid crystal layer, and the electric field controls the alignment of the liquid crystal molecules in the liquid crystal layer.

Advantageous Effects of Invention

According to the present invention, a liquid crystal display device which can be miniaturized while preventing display effects such as flicker is provided.

DESCRIPTION OF EMBODIMENT

In the following, the present invention is described in more detail based on embodiments with reference to drawings. The embodiment is not intended to limit the scope of the present invention.

Embodiment 1

Figure 1:
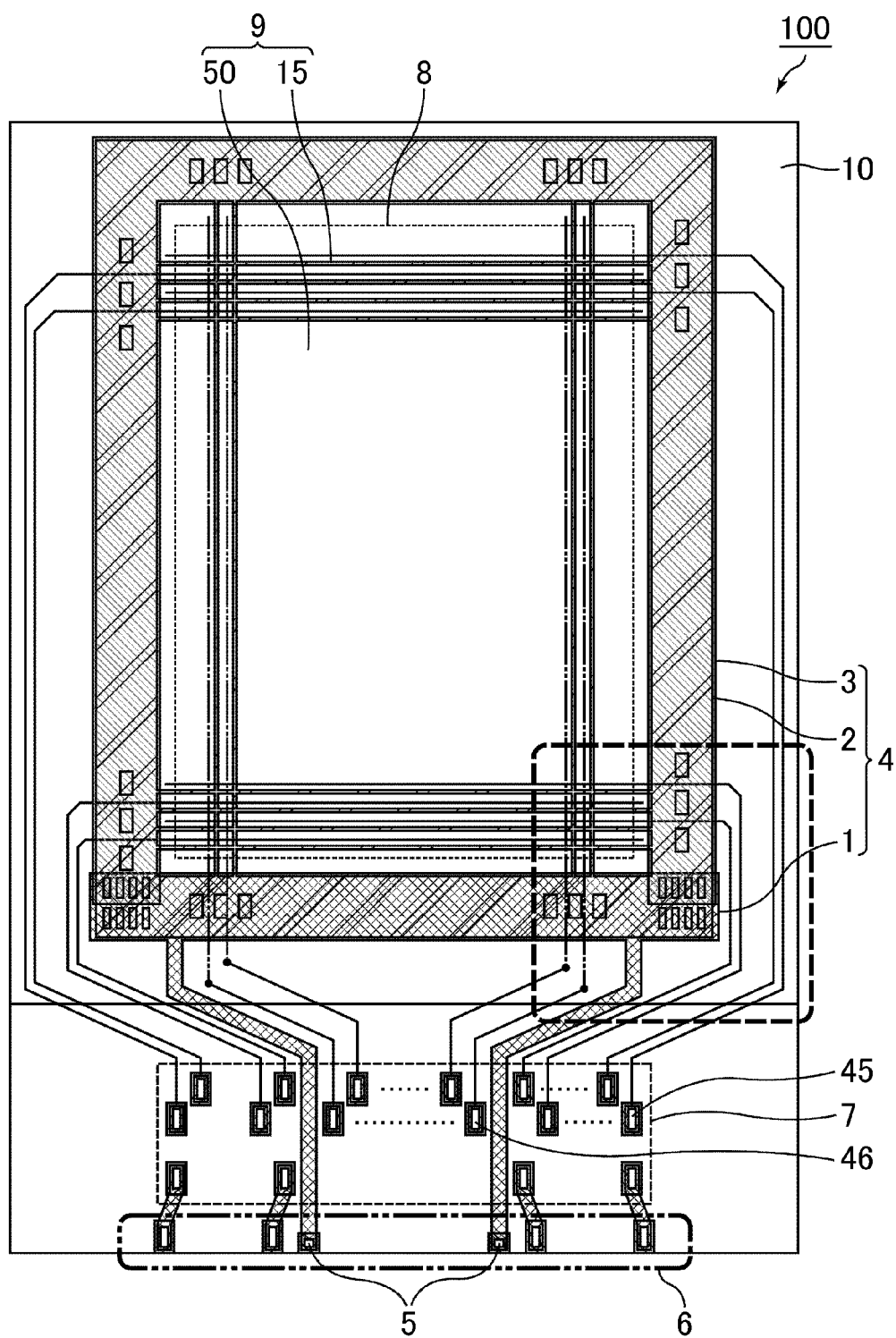
FIG. 1 is a schematic plan view of a liquid crystal display panel of a liquid crystal display device according to Embodiment 1.

The liquid crystal display device according to Embodiment 1 is a FFS mode liquid crystal display device. FIG. 1 is a schematic plan view of a liquid crystal display panel of the liquid crystal display device according to Embodiment 1. An active matrix substrate 100 of the liquid crystal display panel includes a glass substrate 10. On the glass substrate 10, a first wiring portion 1 in a first conductive layer and a second wiring portion 2 in a second conductive layer are formed in the stated order. The first wiring portion 1 and the second wiring portion 2 are formed such that they surround the outer periphery of a display region 8 in a rectangular shape. In addition, a third wiring portion 3 is formed such that it overlaps the first wiring portion 1 and the second wiring portion 2. The third wiring portion 3 is formed in the third conductive layer. The third conductive layer is formed on the second conductive layer. Thus, the first to third wiring portions 1 to 3 are laminated to form a common trunk wiring 4. The common trunk wiring 4 serves as a path to supply a signal to a common electrode 9. A part of the first wiring portion 1 extends to a flexible printed circuits (FPC) mounting portion 6 and is connected to a common signal input terminals in the FPC mounting portion 6. Moreover, a driver mounting portion 7 is formed on the glass substrate 10. A connecting terminal 45 and a connecting terminal 46 in the driver mounting portion 7 are respectively connected to a lead-out wiring connected to a gate bus line and a lead-out wiring connected to a source bus line. The common electrode 9 is formed such that it overlaps the display region 8. The common electrode 9 includes a first electrode portion 50 formed in the transparent conductive layer and a second electrode portion 15 formed in the third conductive layer. The display region 8 is a region capable of displaying images in the liquid crystal display device.

The liquid crystal display panel according to Embodiment 1 includes, in addition to the active matrix substrate 100, a color filter substrate (not shown). The active matrix substrate 100 and the color filter substrate are bonded together with a sealing material and sandwich a liquid crystal layer therebetween. The color filter substrate includes a glass substrate and a color filter and a black matrix (BM) on the substrate. The liquid crystal layer includes a liquid crystal molecule having positive dielectric constant anisotropy.

Figure 2:
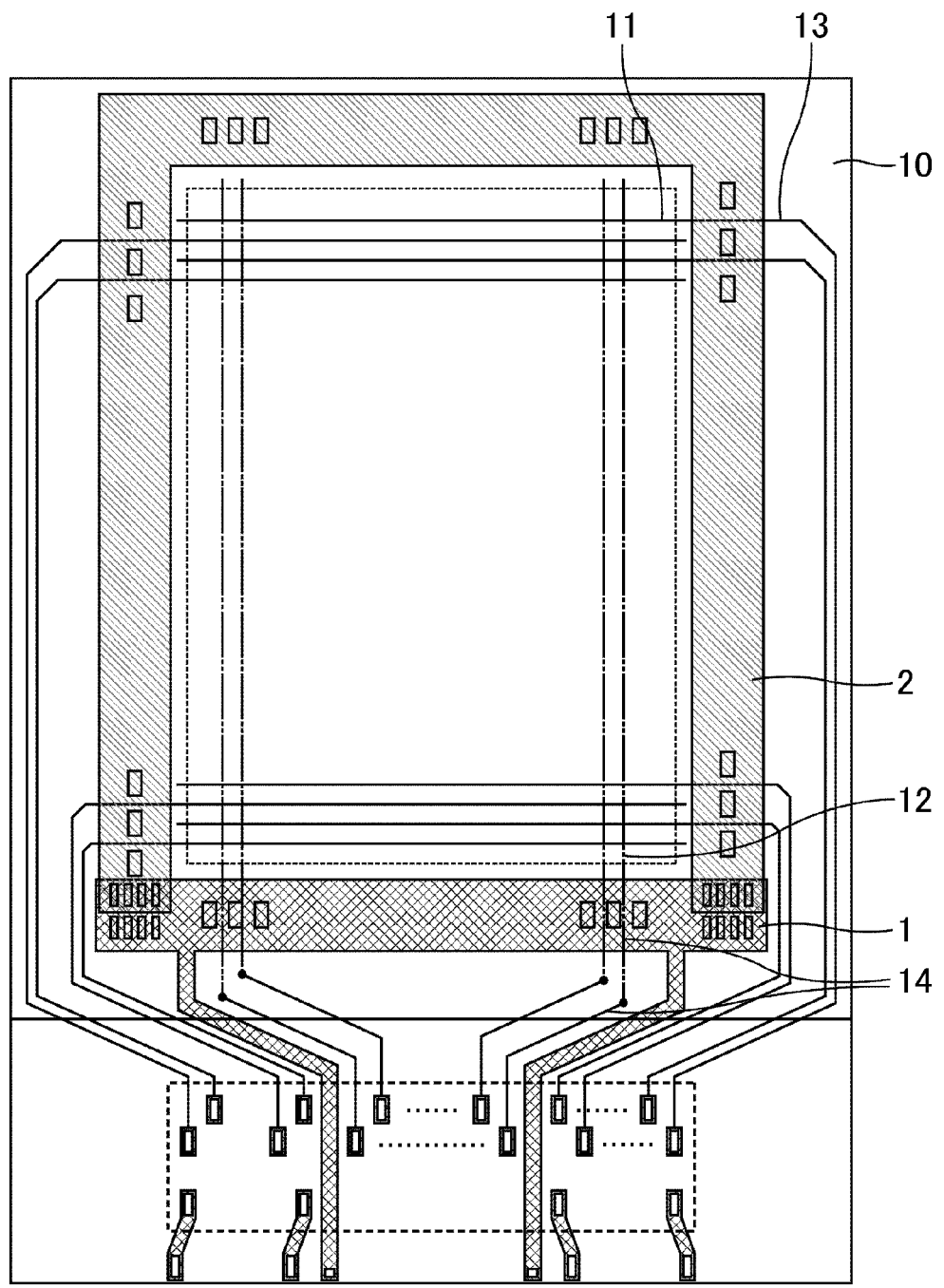
FIG. 2 is a schematic plan view of a first conductive layer and a second conductive layer of an active matrix substrate of the liquid crystal display device according to Embodiment 1.
Figure 3:
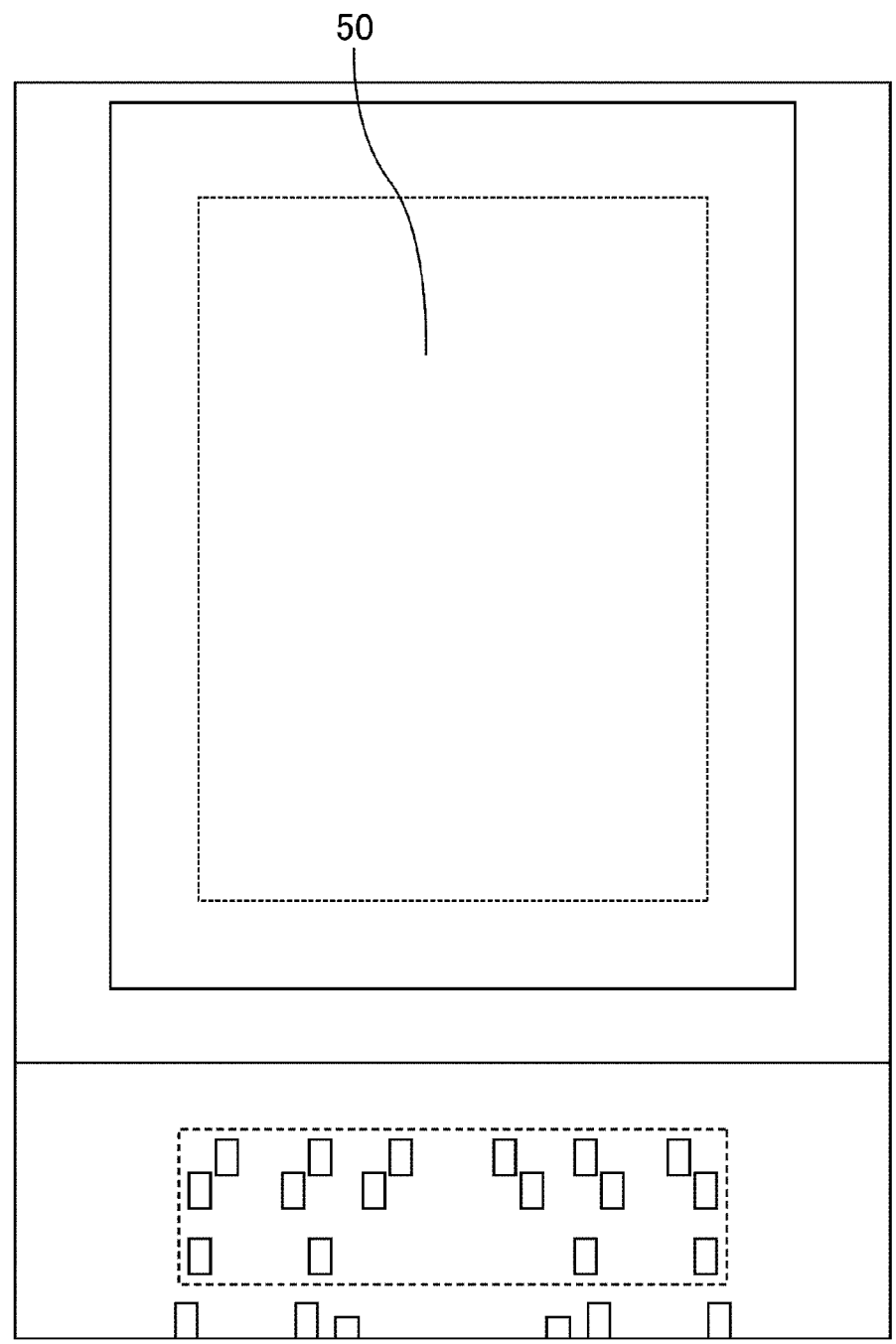
FIG. 3 is a schematic plan view of a transparent conductive layer of the active matrix substrate of the liquid crystal display device according to Embodiment 1.
Figure 4:
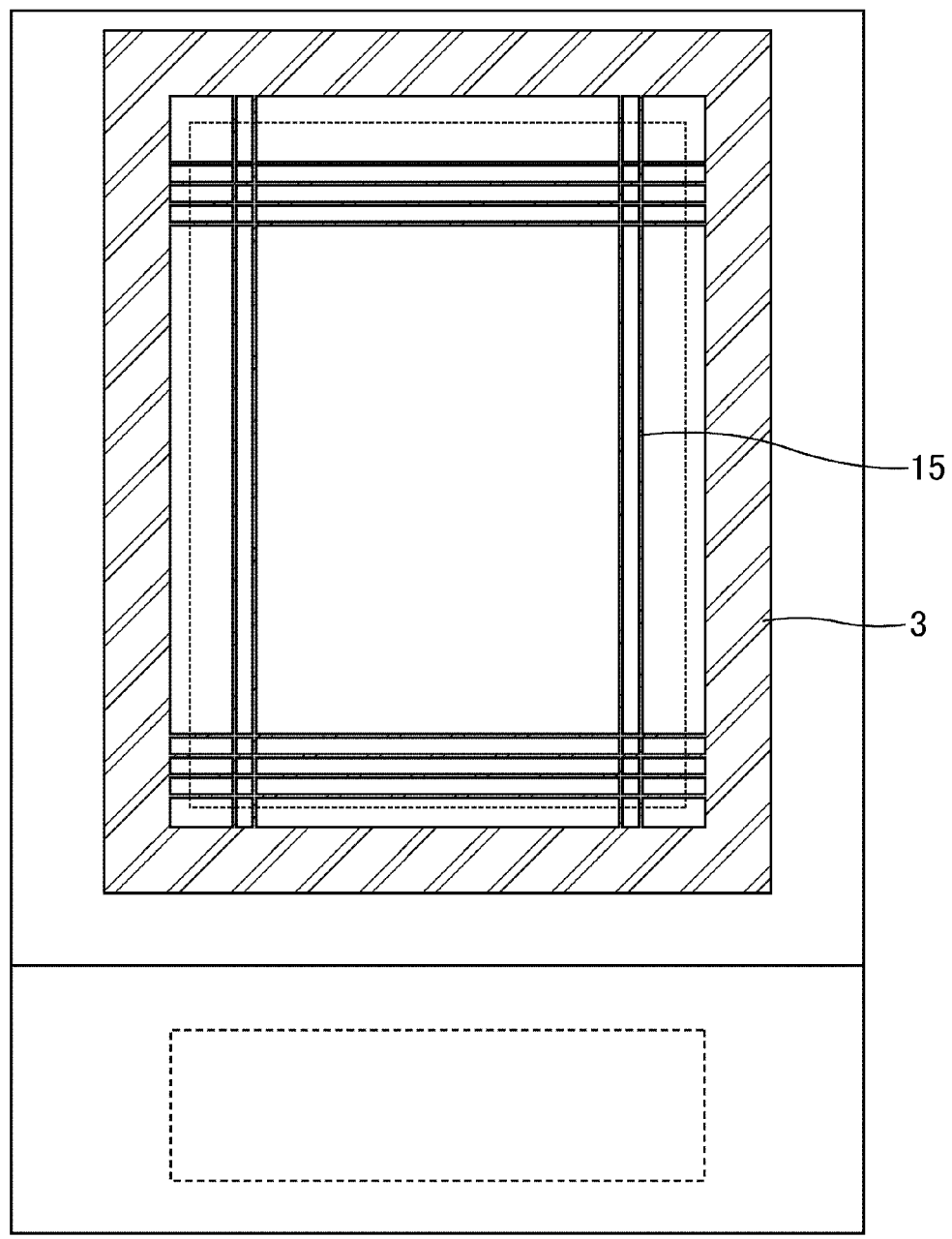
FIG. 4 is a schematic plan view of a third conductive layer of the active matrix substrate of the liquid crystal display device according to Embodiment 1.

The first to third conductive layers and the transparent conductive layer are described in more detail with reference to FIGS. 2 to 4. FIG. 2 is a schematic plan view of a first conductive layer and a second conductive layer of an active matrix substrate of the liquid crystal display device according to Embodiment 1. FIG. 3 is a schematic plan view of a transparent conductive layer of the active matrix substrate of the liquid crystal display device according to Embodiment 1. FIG. 4 is a schematic plan view of a third conductive layer of the active matrix substrate of the liquid crystal display device according to Embodiment 1.

As shown in FIG. 2, the first conductive layer includes the first wiring portion 1, gate bus lines 11, gate bus line lead-out wirings 13, and parts of source bus line lead-out wirings 14. The second conductive layer includes the second wiring portion 2, source bus lines 12, and parts of the source bus line lead-out wirings 14. The first wiring portion 1 and the second wiring portion 2 are formed in the outer peripheral region of the display region 8. The gate bus lines 11 and the source bus lines 12 are formed in the display region 8. The gate bus lines 11 and the source bus lines 12 define pixels. The gate bus lines 11 and the source bus lines 12 are respectively connected to the gate bus line lead-out wirings 13 and the source bus line lead-out wirings 14. The source bus line lead-out wirings 14 are formed in both the first conductive layer and the second conductive layer. In other words, the source bus line lead-out wirings 14 are formed in both the first conductive layer and the second conductive layer through a connecting portion. The lead-out wirings 13 and 14 are respectively connected to the connecting terminals 45 and the connecting terminals 46 in the driver mounting portion 7. The first and second conductive layers are typically formed from a metal material such as copper, aluminum, titanium, molybdenum, an alloy thereof, and a laminated film thereof. Examples of the laminated film include a film obtainable by laminating an aluminum single layer film and a titanium single layer film; and a film obtainable by laminating an aluminum single layer film and a molybdenum single layer film. The first conductive layer and the second conductive layer each have a film thickness of 0.1 to 0.6 µm.

As shown in FIG. 3, the transparent conductive layer includes a first electrode portion 50. The first electrode portion 50 covers the display region 8. The transparent conductive layer is formed from a transparent conductive film material such as ITO and IZO. The transparent conductive layer has a film thickness of 0.03 to 0.2 µm and has a sheet resistance of 10 to 70Ω/□. In the case that the transparent conductive layer has slits and an alignment film disposed on the transparent conductive layer is subjected to a rubbing treatment, the transparent conductive layer is preferably thin. If the transparent conductive layer has a film thickness as small as about 0.03 to 0.07 µm, the layer has a sheet resistance of 30Ω/□ or greater.

As shown in FIG. 4, the third conductive layer includes the third wiring portion 3 overlapping the first wiring portion 1 and the second wiring portion 2; and a second electrode portion 15 formed between adjacent pixel electrodes. The second electrode portion 15 and the third wiring portion 3 are connected to each other. The third conductive layer may be formed from a transparent conductive film material such as ITO and IZO. For the common trunk wiring 4 to have a smaller resistance, the third conductive layer is preferably formed from a metal material such as copper, aluminum, titanium, molybdenum, an alloy thereof, and a laminated film thereof. Examples of the laminated film include a film obtainable by laminating an aluminum single layer film and a titanium single layer film; and a film obtainable by laminating an aluminum single layer film and a molybdenum single layer film. The second electrode portion 15 is connected to the first electrode portion 50 in the transparent conductive layer to form the common electrode 9. The third conductive layer has a film thickness of 0.02 to 0.2 µm and has a sheet resistance of 0.15 to 3.0Ω/□. Thus, the difference between the sheet resistance of the transparent conductive layer and that of the third conductive layer is 7.0 to 69.75Ω/□.

Figure 5:
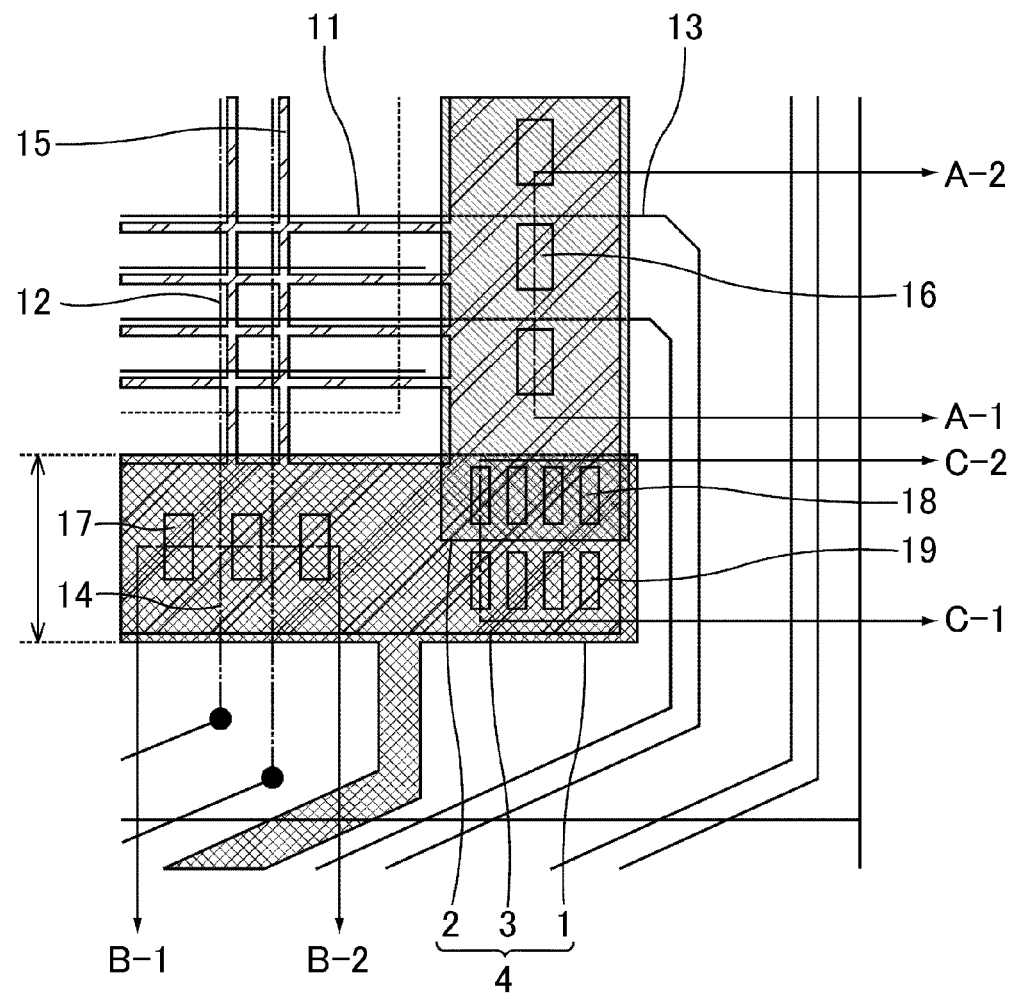
FIG. 5 is an enlarged schematic plan view of a region enclosed in a heavy dashed line in FIG. 1.
Figure 6:
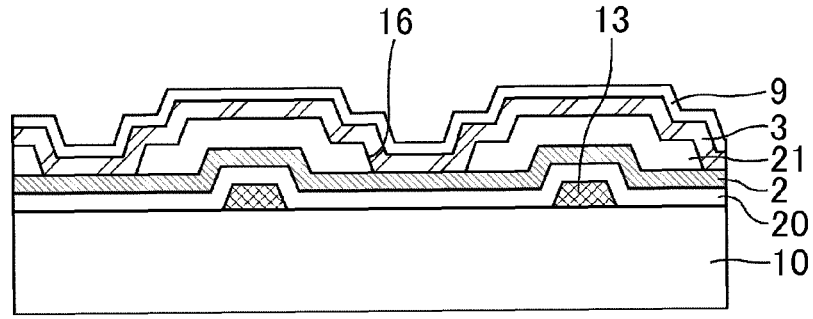
FIG. 6 is a schematic cross-sectional view along the line (A-1)-(A-2) in FIG. 5.
Figure 7:
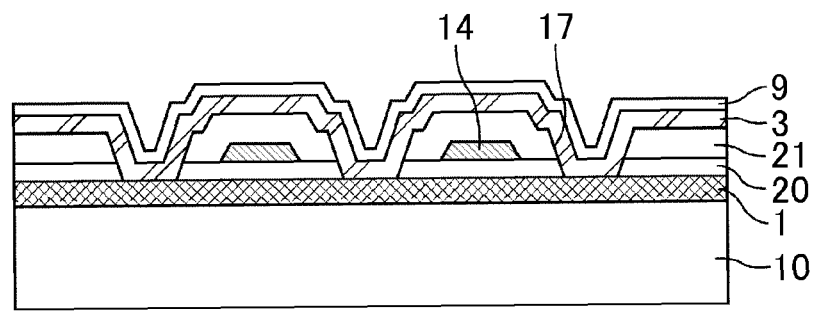
FIG. 7 is a schematic cross-sectional view along the line (B-1)-(B-2) in FIG. 5.
Figure 8:
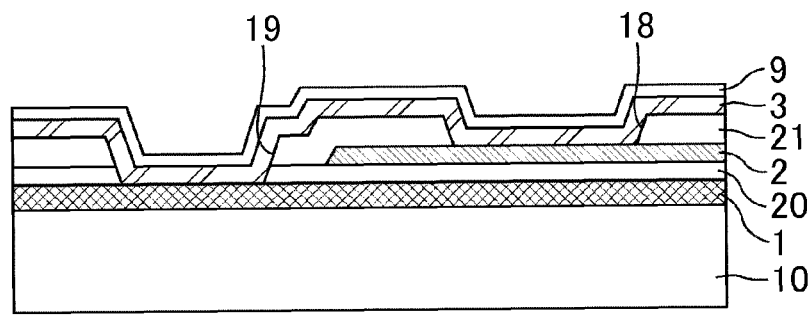
FIG. 8 is a schematic cross-sectional view along the line (C-1)-(C-2) in FIG. 5.

In the following, the active matrix substrate of the liquid crystal display device according to Embodiment 1 is described in more detail with reference to FIGS. 5 to 8. FIG. 5 is an enlarged schematic plan view of a region enclosed in a heavy dashed line in FIG. 1. FIG. 6 is a schematic cross-sectional view along the line (A-1)-(A-2) in FIG. 5. FIG. 7 is a schematic cross-sectional view along the line (B-1)-(B-2) in FIG. 5. FIG. 8 is a schematic cross-sectional view along the line (C-1)-(C-2) in FIG. 5.

As shown in FIG. 6, in the cross-section along the line (A-1)-(A-2) in FIG. 5, the gate bus line lead-out wirings 13 in the first conductive layer, a first insulating film 20, the second wiring portion 2 in the second conductive layer, a second insulating film 21, the third wiring portion 3 in the third conductive layer, and the common electrode 9 (the first electrode portion 50 formed in the transparent conductive layer) are formed on the glass substrate 10 in the stated order. The second insulating film 21 has contact holes 16, and the third wiring portion 3 is connected to the second wiring portion 2 through the contact holes 16. The first insulating film 20 is formed from silicon nitride (SiNx), silicon oxide (SiOx), or the like. The second insulating film 21 may be formed from a material such as silicon nitride (SiNx) and silicon oxide (SiOx), or may be formed from a photosensitive resin film, a laminated film thereof, or the like.

In Embodiment 1, the transparent conductive layer is formed on the third conductive layer. Alternatively, the third conductive layer may be formed on the transparent conductive layer. The transparent conductive layer and the third conductive layer thus being adjacent to each other eliminate the need for a step of forming another layer such as an interlayer insulating film between a step of forming the transparent conductive layer and a step of forming the third conductive layer. This reduces the number of steps and the cost. In addition, the transparent conductive layer can easily contact the third conductive layer, and thus the third wiring portion 3 can easily and reliably contact the common electrode 9.

As shown in FIG. 7, in the cross-section along the line (B-1)-(B-2) in FIG. 5, the first wiring portion 1 in the first conductive layer, the first insulating film 20, the source bus line lead-out wiring 14 in the second conductive layer, the second insulating film 21, the third wiring portion 3 in the third conductive layer, and the common electrode 9 on the third wiring portion 3 are formed on the glass substrate 10 in the stated order. A contact hole 17 is formed in the first insulating film 20 and the second insulating film 21. The third wiring portion 3 is connected to the first wiring portion 1 through the contact hole 17.

In FIGS. 5 to 7, the first conductive layer includes the first wiring portion 1 and the second conductive layer includes the second wiring portion 2. Alternatively, the first conductive layer may include the second wiring portion 2 and the second conductive layer may include the first wiring portion 1. In this case, the connecting portion for the source bus line lead-out wiring 14 is formed near the display region 8 (a region between the first wiring portion 1 and the display region 8) such that the source bus line lead-out wiring 14 does not contact the first wiring portion 1.

As shown in FIG. 8, in the cross-section along the line (C-1)-(C-2) in FIG. 5, the first wiring portion 1 in the first conductive layer, the first insulating film 20, the second wiring portion 2 in the second conductive layer, the second insulating film 21, the third wiring portion 3 in the third conductive layer, and the common electrode 9 on the third wiring portion 3 are formed on the glass substrate 10 in the stated order. The second insulating film 21 has a contact hole 18. The third wiring portion 3 and the second wiring portion 2 are connected to each other through the contact hole 18. In addition, a contact hole 19 is formed in the second insulating film 21 and the first insulating film 20, and the third wiring portion 3 and the first wiring portion 1 are connected to each other through the contact hole 19. That is, the first wiring portion 1 is connected to the second wiring portion 2 through the third wiring portion 3. The first wiring portion 1 may be connected to the second wiring portion 2 through a connecting electrode. In this embodiment, the third wiring portion 3 eliminates the need for such a connecting electrode for connecting these wiring portions. This is one of the characteristics of this embodiment.

Figure 9:
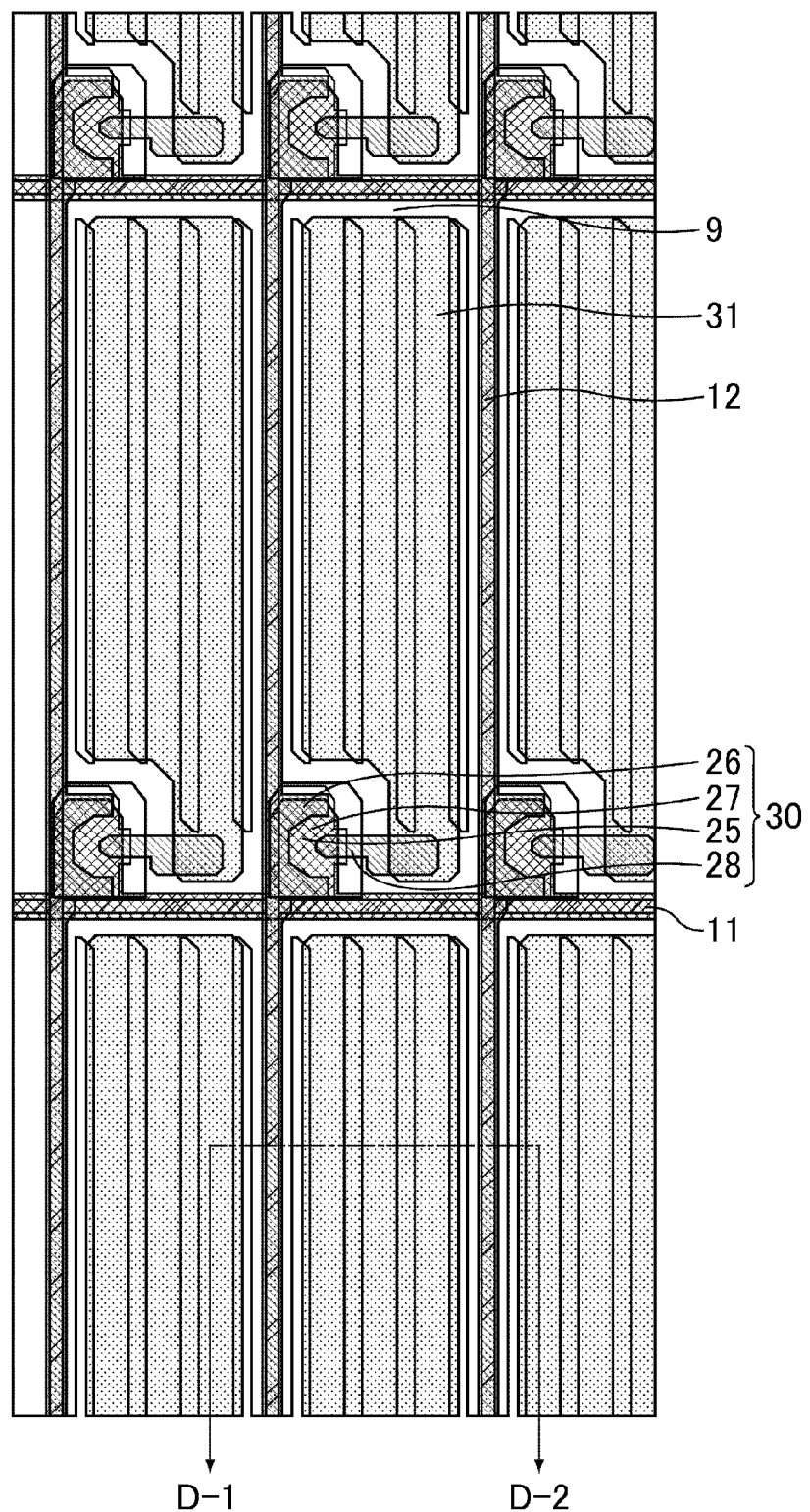
FIG. 9 is a schematic plan view showing a structure of a pixel in the liquid crystal display device according to Embodiment 1.
Figure 10:
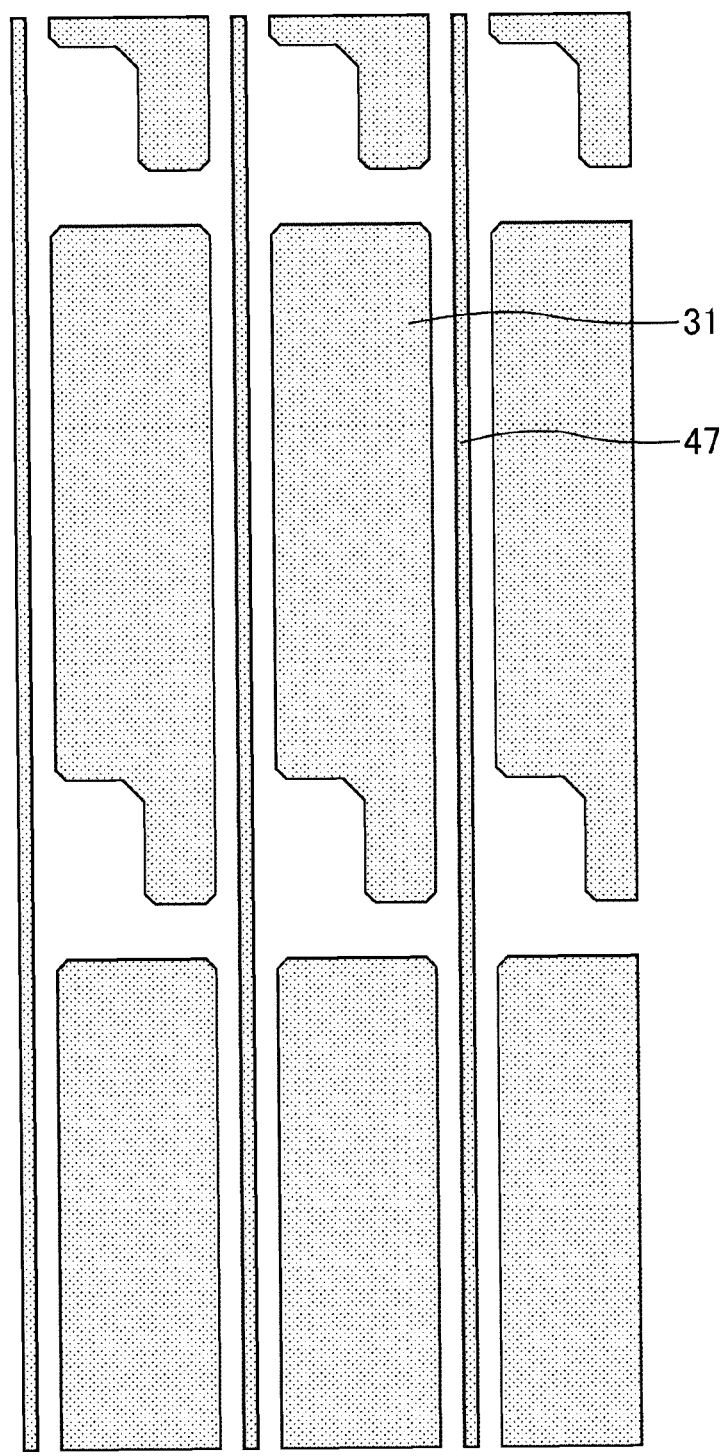
FIG. 10 is a schematic plan view of a pixel electrode layer in FIG. 9.
Figure 11:
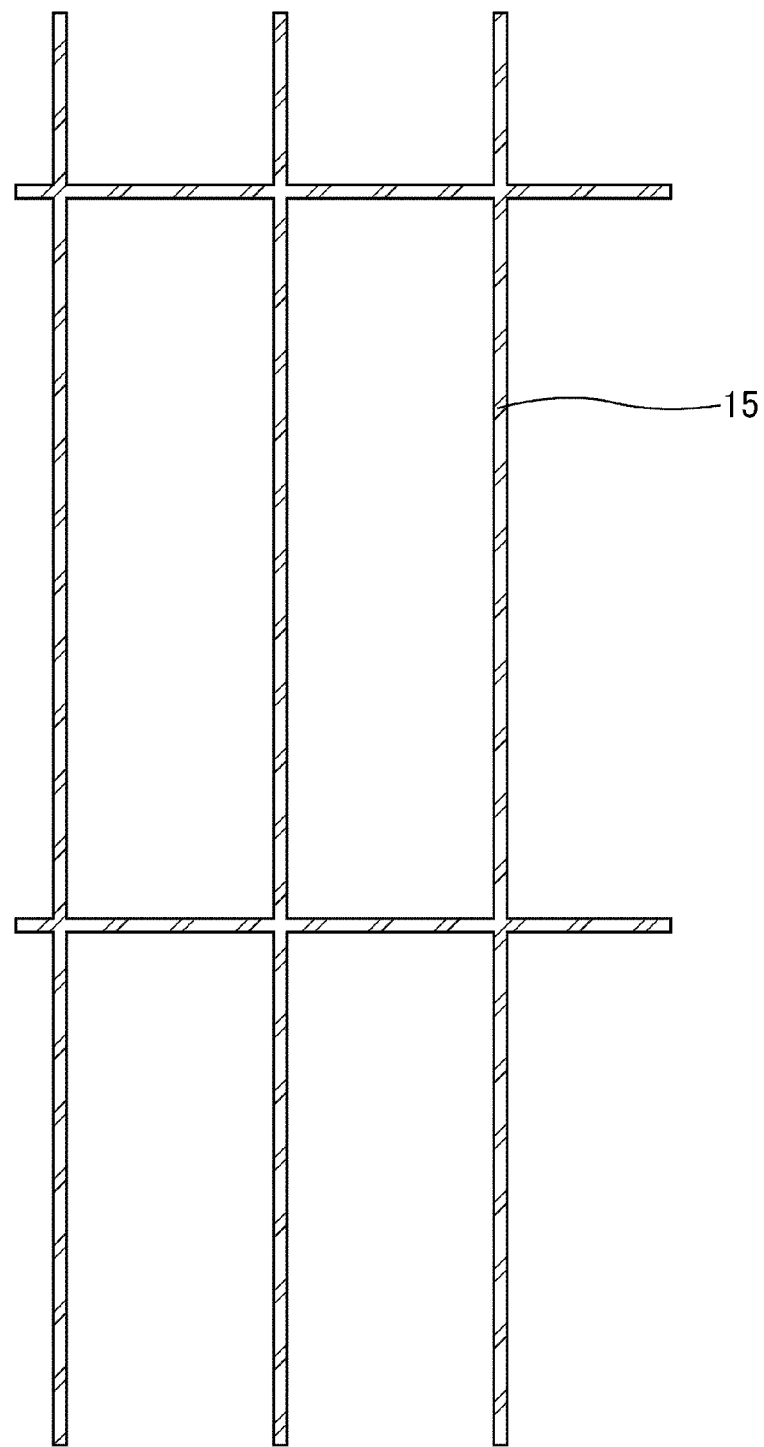
FIG. 11 is a schematic plan view showing a third conductive layer in FIG. 9.
Figure 12:
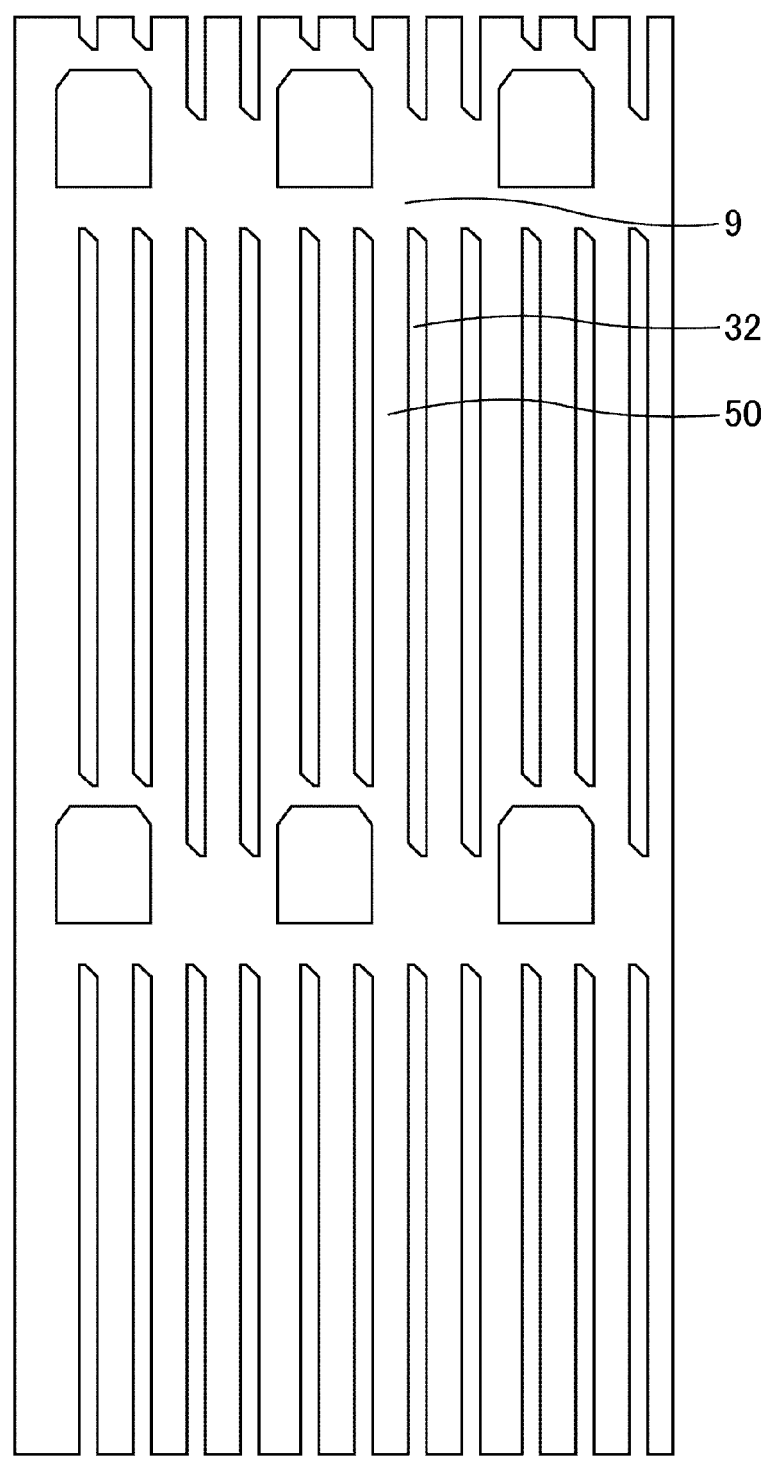
FIG. 12 is a schematic plan view of a transparent conductive layer in FIG. 9.
Figure 13:
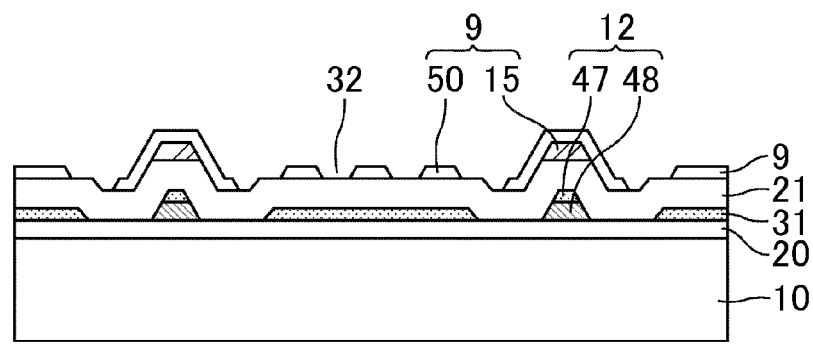
FIG. 13 is a schematic cross-sectional view along the line (D-1)-(D-2) in FIG. 9.

In the following, the structure of the pixels in the liquid crystal display device according to Embodiment 1 is described with reference to FIGS. 9 to 13. FIG. 9 is a schematic plan view showing a structure of pixels in the liquid crystal display device according to Embodiment 1. FIG. 10 is a schematic plan view of a pixel electrode layer in FIG. 9. FIG. 11 is a schematic plan view showing a third conductive layer in FIG. 9. FIG. 12 is a schematic plan view of a transparent conductive layer in FIG. 9. FIG. 13 is a schematic cross-sectional view along the line (D-1)-(D-2) in FIG. 9.

As shown in FIG. 9, a TFT 30 including a gate electrode 25, a source electrode 26, a semiconductor layer 27, and a drain electrode 2 is formed in each pixel. The gate electrode 25 is connected to the gate bus line 11, and the source electrode 26 is connected to the source bus line 12. The drain electrode 28 is connected to a pixel electrode 31. The pixel electrode 31 is formed from a transparent conductive film material such as ITO and IZO.

The pixel electrode 31 is formed from a transparent conductive film (pixel electrode layer) such that the pixel electrode 31 overlaps the aperture area of the pixel, as shown in FIG. 10. In addition, a second source bus line portion 47 which is a component of the source bus line 12 is formed from the pixel electrode layer. In the third conductive layer, a second electrode portion 15 is formed between adjacent pixels, as shown in FIG. 11. In the transparent conductive layer, a first electrode portion 50 having slits 32 is formed, as shown in FIG. 12.

As shown in FIG. 13, the pixel electrode 31 faces the slits 32 of the first electrode portion 50 in the pixel. The first electrode portion 50 is formed on the second electrode portion 15, and the first electrode portion 50 and the second electrode portion 15 form a common electrode 9. The source bus line 12 includes a first source bus line portion 48 formed in the second conductive layer and a second source bus line portion 47 formed in the pixel electrode layer.

Though the source bus line formed from two conductive layers, as that in the liquid crystal display device according to Embodiment 1, can prevent disconnection of the wiring (redundancy to prevent wire disconnection), the second source bus line portion 47 formed from the pixel electrode layer may not be present. In Embodiment 1, the pixel electrode layer is formed on the second conductive layer. Alternatively the second conductive layer may be formed on the pixel electrode layer. In this case, the first source bus line portion 48 is formed on the second source bus line portion 47.

As described above, the common trunk wiring 4 in the liquid crystal display device according to Embodiment 1 includes a laminated structure including the first wiring portion 1 and/or the second wiring portion 2 and the third wiring portion 3 that is formed on the liquid crystal-layer side of the first and/or second wiring portion with an insulating film therebetween and is connected to the first and/or the second wiring portion. Thereby, if the width of the common trunk wiring 4 is reduced with miniaturization of the liquid crystal display panel, the electric resistance is less likely to increase, which prevents the display defects such as flicker. In other words, the more the width of the common trunk wiring 4 is reduced, the smaller the liquid crystal display panel can be while preventing display defects such as flicker.

In Embodiment 1, the FFS mode using the common electrode 9 with the slits 32 is taken as an example. The same structure also can be applied to, for example, an in-plane switching mode liquid crystal display device which includes the common electrode 9 and the pixel electrode 31 each having a comb-tooth structure. In addition, for example, the structure can be applied to a transverse bend alignment (TBA) mode liquid crystal display device in which the liquid crystal layer includes liquid crystal molecules having negative dielectric constant anisotropy. The TBA mode refers to a display mode in which the alignment of liquid crystal molecules is changed from a vertical alignment to a bend alignment in the horizontal direction by lateral electric field from a pair of electrodes (e.g., a common electrode and a pixel electrode each having a comb-tooth structure) formed in one substrate.

In Embodiment 1, the common trunk wiring 4 is formed along all four sides of the display region 8. The common trunk wiring 4 is formed along at least one of the sides. Also, the third wiring portion 3, which is formed along the all four sides of the display region 8 in Embodiment 1, may be formed along any one side of the display region 8, or may be formed along part of any one side of the display region 8.

The first to third wiring portions 1 to 3 may have substantially the same width or different widths.

In Embodiment 1, the grid-like second electrode portion 15 is formed along a gap between adjacent pixels. Though this contributes to the reduction in the resistance of the common electrode 9, the second electrode portion 15 may not be formed. The second electrode portion 15 may not have a grid-like shape, and may instead have a stripe-like shape extending only in one direction (e.g., only in a drawing direction of the gate bus line).

In Embodiment 1, the transparent conductive layer is formed on the third conductive layer. Alternatively, the third conductive layer may be formed on the transparent conductive layer.

Figure 23:
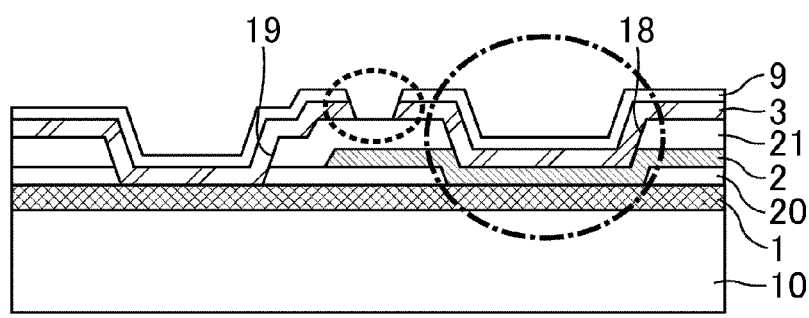
FIG. 23 is a schematic cross-sectional view of a liquid crystal display panel of a liquid crystal display device according to a modified example of Embodiment 1.

FIG. 23 is a schematic cross-sectional view of a liquid crystal display panel of a liquid crystal display device according to a modified example of Embodiment 1. The location of the cross-section shown in FIG. 23 corresponds to that of the cross-section shown in the schematic cross-sectional view of FIG. 8 for Embodiment 1. The first wiring portion 1 in Embodiment 1 is connected to the second wiring portion 2 through third wiring portion 3 as shown in FIG. 8, but the first wiring portion 1 may be directly connected to the second wiring portion through a contact hole formed in the first insulating layer 20 in the region enclosed in the dashed line, as shown in FIG. 23.

In this case, the third wiring portion 3 and the common electrode 9 each may or may not have a discontinuity in the region enclosed in the dotted line in FIG. 23. If they have a discontinuity in this region, the following advantageous effect can be obtained. In a design in which a sealing material containing a spacer (e.g., fibrous glass) overlaps both the third wiring portion 3 and the common electrode 9 in the connecting portion of the first and second wiring portions 1 and 2, the discontinuity prevents peel-off of the common electrode 9 from the third wiring portion 3 caused by stress from the spacer. However, in view of the effect of the redundant structure exerted on bad connection which may occur in the region enclosed in the dashed line, typically employed is the structure in which the third wiring portion 3 and the common electrode 9 do not have the discontinuity.

Figure 24:
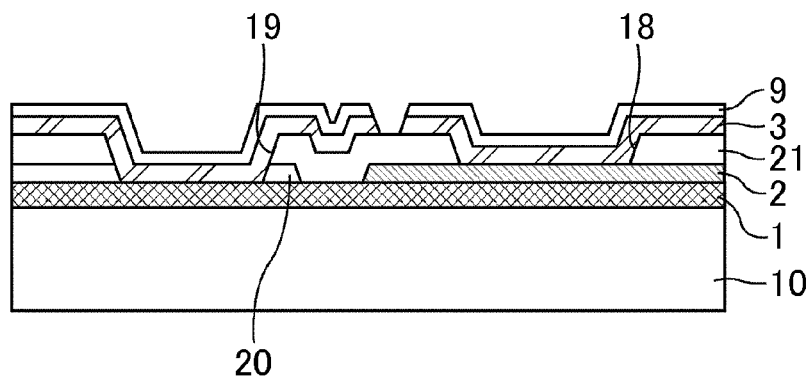
FIG. 24 is a schematic cross-sectional view of a liquid crystal display panel of a liquid crystal display device according to another modified example of Embodiment 1.

FIG. 24 is a schematic cross-sectional view of a liquid crystal display panel of a liquid crystal display device according to another modified example of Embodiment 1. The location of the cross-section shown in FIG. 24 corresponds to that of the cross-section shown in the schematic cross-sectional view of FIG. 8 for Embodiment 1. In the region where the first wiring portion 1 and the second wiring portion 2 overlap, the second wiring portion 2 may not overlap the first insulating film 20, and may instead be formed in the aperture of the first insulating film 20 as shown in FIG. 24.

Embodiment 2

The first wiring portion 1, the second wiring portion 2, and the third wiring portion 3 have substantially the same width in Embodiment 1. Alternatively, one or more of the first to third wiring portions may be constricted at a portion thereof.

Figure 14:
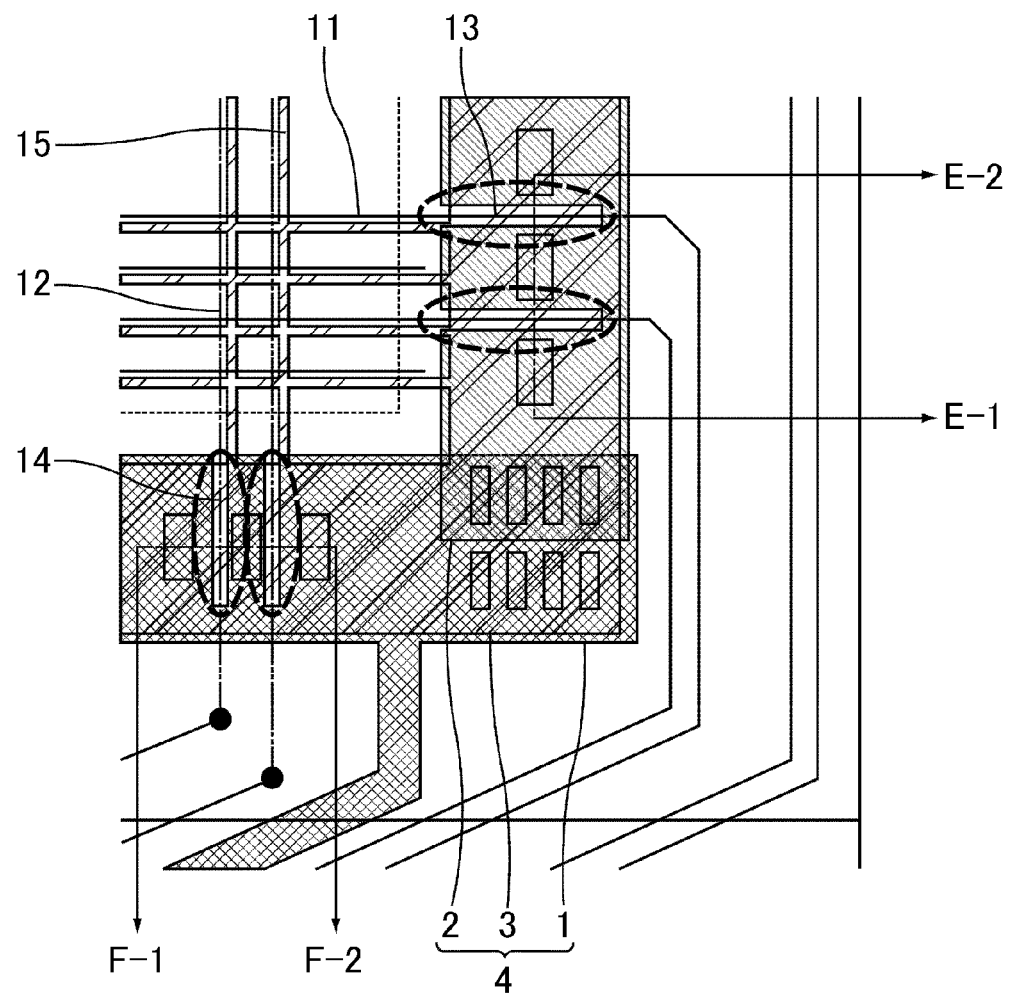
FIG. 14 is a schematic plan view of an active matrix substrate of a liquid crystal display device according to Embodiment 2.
Figure 15:
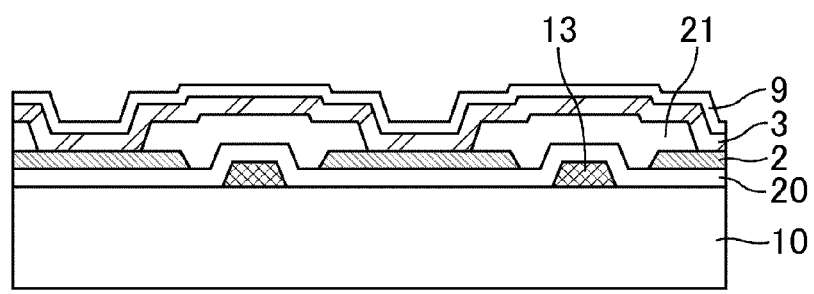
FIG. 15 is a schematic cross-sectional view along the line (E-1)-(E-2) in FIG. 14.
Figure 16:
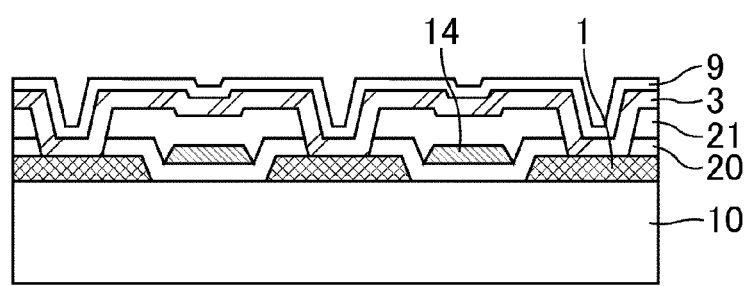
FIG. 16 is a schematic cross-sectional view along the line (F-1)-(F-2) in FIG. 14.

The liquid crystal display device according to Embodiment 2 is described below with reference to the FIGS. 14 to 16. FIG. 14 is a schematic plan view of an active matrix substrate of a liquid crystal display device according to Embodiment 2, and it corresponds to FIG. 5 for Embodiment 1. FIG. 15 is a schematic cross-sectional view along the line (E-1)-(E-2) in FIG. 14. FIG. 16 is a schematic cross-sectional view along the line (F-1)-(F-2) in FIG. 14.

As shown in FIGS. 14 and 15, the second wiring portion 2 is constricted (narrow) at an intersection of the second wiring portion 2 and the gate bus line lead-out wiring 13. Thereby, the region where the second wiring portion 2 and the lead-out wiring 13 intersect can be smaller, decreasing the parasitic capacity produced in this region. Also, the first wiring portion 1 is constricted (narrow) at an intersection of the first wiring portion 1 and the source bus line lead-out wiring 14 as shown in FIGS. 14 and 16, so that the region where the first wiring portion 1 and the lead-out wiring 14 intersect can be smaller, decreasing the parasitic capacity produced in this region. In FIGS. 14 and 16, the third wiring portion 3 may be constricted at an intersection of the third wiring portion 3 and the source bus line lead-out wiring 14.

In order to further decrease the parasitic capacity in this case, if a value (hereinafter, also referred to as "value A") calculated by dividing the relative permittivity of the second insulating film 21 by the film thickness of the second insulating film 21 is larger than a value (hereinafter, also referred to as "value B") calculated by dividing the relative permittivity of the first insulating film 20 by the film thickness of the first insulating film 20, the third wiring portion 3, rather than the first wiring portion 1, is preferably preferentially constricted at intersection(s) of the wiring portion 3 and the lead-out wiring 13 and/or the lead-out wiring 14. By constricting the electrode (wiring portion) which faces the lead-out wiring with such an insulating film therebetween in which the value calculated by dividing the relative permittivity of the film by the film thickness of the film is large, the parasitic capacity produced between the common trunk wiring and the lead-out wiring 13 and/or the lead-out wiring 14 can be more effectively decreased.

For example, if the first insulating film 20 and the second insulating film 21 are formed from silicon nitride (SiNx), the insulating films 20 and 21 each have a relative permittivity of 6 to 8. In this case, the value A can be larger than the value B if the first insulating film 20 has a film thickness in the range of 0.30 to 0.50 μm and the second insulating film 21 has a film thickness that is in the range of 0.20 to 0.40 μm and smaller than the film thickness of the first insulating film. As long as the value A is larger than the value B, the parasitic capacity produced between the common trunk wiring and the lead-out wiring 13 and/or the lead-out wiring 14 can be more efficiently reduced by preferentially constricting the third wiring portion 3. Therefore, the difference between the values A and B is not particularly limited.

More specifically, the third wiring portion 3 is preferably preferentially constricted in the case that, for example, the first insulating film 20 is formed from silicon nitride (SiNx) with a relative permittivity of 6.4 and has a film thickness of 0.45 μm and the second insulating film 21 is formed from silicon nitride (SiNx) with a relative permittivity of 6.4 and has a film thickness of 0.35 μm.

From the same viewpoint, if the value (value A) calculated by dividing the relative permittivity of the second insulating film 21 by the film thickness of the second insulating film 21 is smaller than the value (value B) calculated by dividing the relative permittivity of the first insulating film 20 by the film thickness of the first insulating film 20, the first wiring portion 1, rather than the third wiring portion 3, is preferably preferentially constricted at an intersection of the first wiring portion 1 and the lead-out wiring 14.

For example, if the first insulating film 20 is formed from silicon nitride (SiNx), the first insulating film 20 has a relative permittivity of 6 to 8. In this case, the value A can be smaller than the value B if the first insulating film 20 has a film thickness of 0.30 to 0.50 μm; the second insulating film 21 is formed from a laminate of silicon nitride (SiNx) having a relative permittivity of 6 to 8 and a photosensitive acrylic resin having a relative permittivity of 3.4 to 3.8; the silicon nitride film has a film thickness of 0.20 to 0.40 μm; and the photosensitive acrylic resin has a film thickness of 1.0 to 4.0 μm. As long as the value A is smaller than the value B, the parasitic capacity produced between the common trunk wiring and the lead-out wiring 14 can be more efficiently reduced by preferentially constricting the first wiring portion 1. The difference between the values A and B is not particularly limited.

More specifically, the first wiring portion 3 is preferably preferentially constricted in the case that, for example, the following conditions are satisfied: the first insulating film 20 is formed from silicon nitride (SiNx) with a relative permittivity of 6.4 and has a film thickness of 0.45 μm; the second insulating film 21 is formed from a laminated film of a film formed from silicon nitride (SiNx) with a relative permittivity of 6.4 and having a film thickness of 0.2 μm and a film formed from a photosensitive acrylic resin with a relative permittivity of 3.4 and having a film thickness of 1.0 μm.

In Embodiment 2, an increase in the parasitic capacity between the lead-out wiring and the common trunk wiring can be prevented while the effect of reducing the resistance of the common trunk wiring is obtained.

Embodiment 3

In Embodiments 1 and 2, FFS mode liquid crystal display devices in which the electrode of the liquid crystal display device of the present invention functions as a common electrode are taken as examples. The electrode of the liquid crystal display device of the present invention is not limited to the common electrode, and may function as an auxiliary capacitance electrode, for example. In the liquid crystal display device according to Embodiment 3, an auxiliary capacitance of each pixel is formed by a pixel electrode, an auxiliary capacitance electrode, and an insulating film therebetween. The pixel electrode and the auxiliary capacitance electrode each are formed from a transparent conductive film material such as ITO and ITO, and thus they can form a large auxiliary capacitance without greatly reducing the transmittance (hereinafter, this structure is also referred to as transparent Cs structure). The liquid crystal display device according to Embodiment 3 is a continuous pinwheel alignment (CPA) mode liquid crystal display device including the transparent Cs structure. The liquid crystal display device according to Embodiment 3 also includes the common trunk wiring 4 having a laminated structure including the first to third wiring portions 1 to 3, as the liquid crystal display device according to Embodiment 1.

Figure 17:
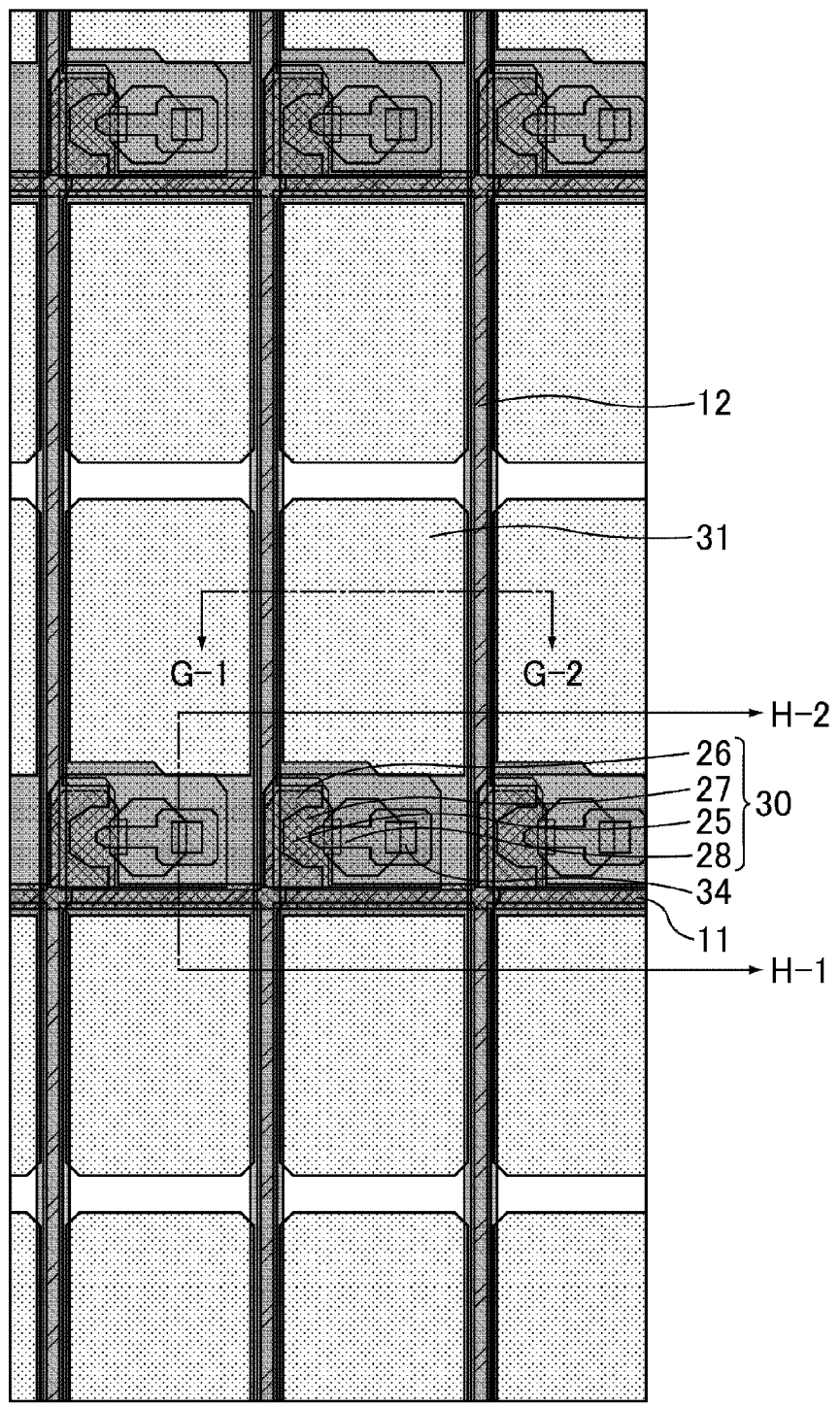
FIG. 17 is a schematic plan view showing a structure of a pixel in the liquid crystal display device according to Embodiment 3.
Figure 18:
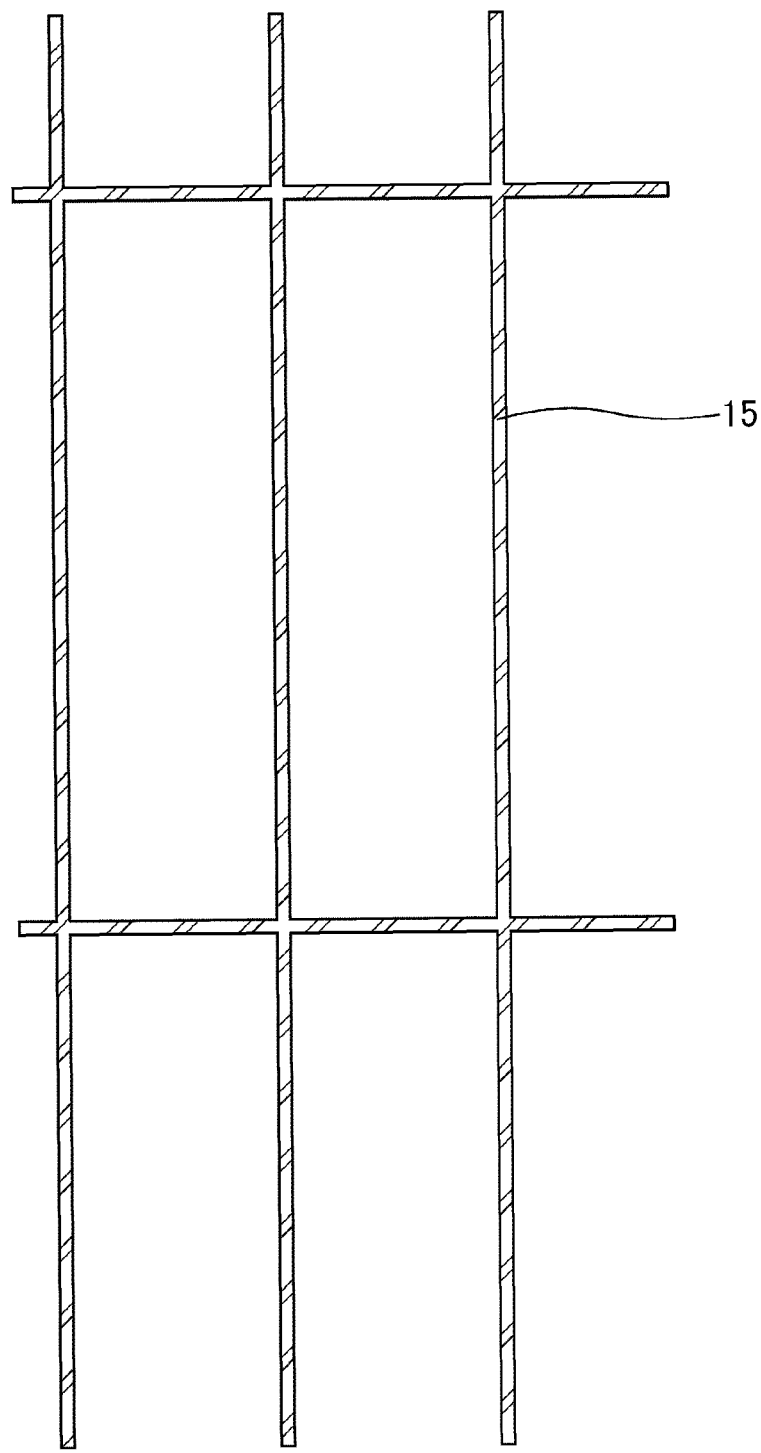
FIG. 18 is a schematic plan view of a third conductive layer of a liquid crystal display device according to Embodiment 3.
Figure 19:
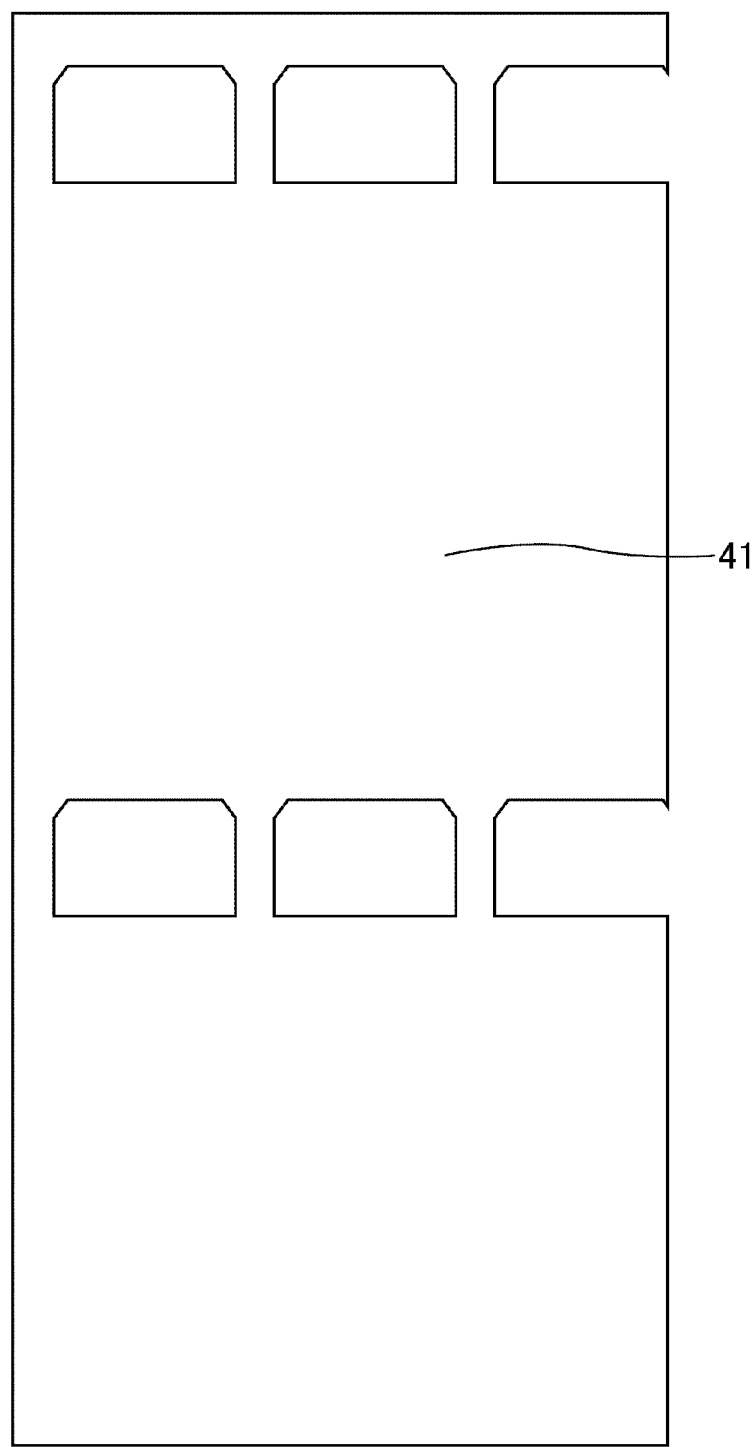
FIG. 19 is a schematic plan view of a transparent conductive layer of an active matrix substrate of the liquid crystal display device according to Embodiment 3.
Figure 20:
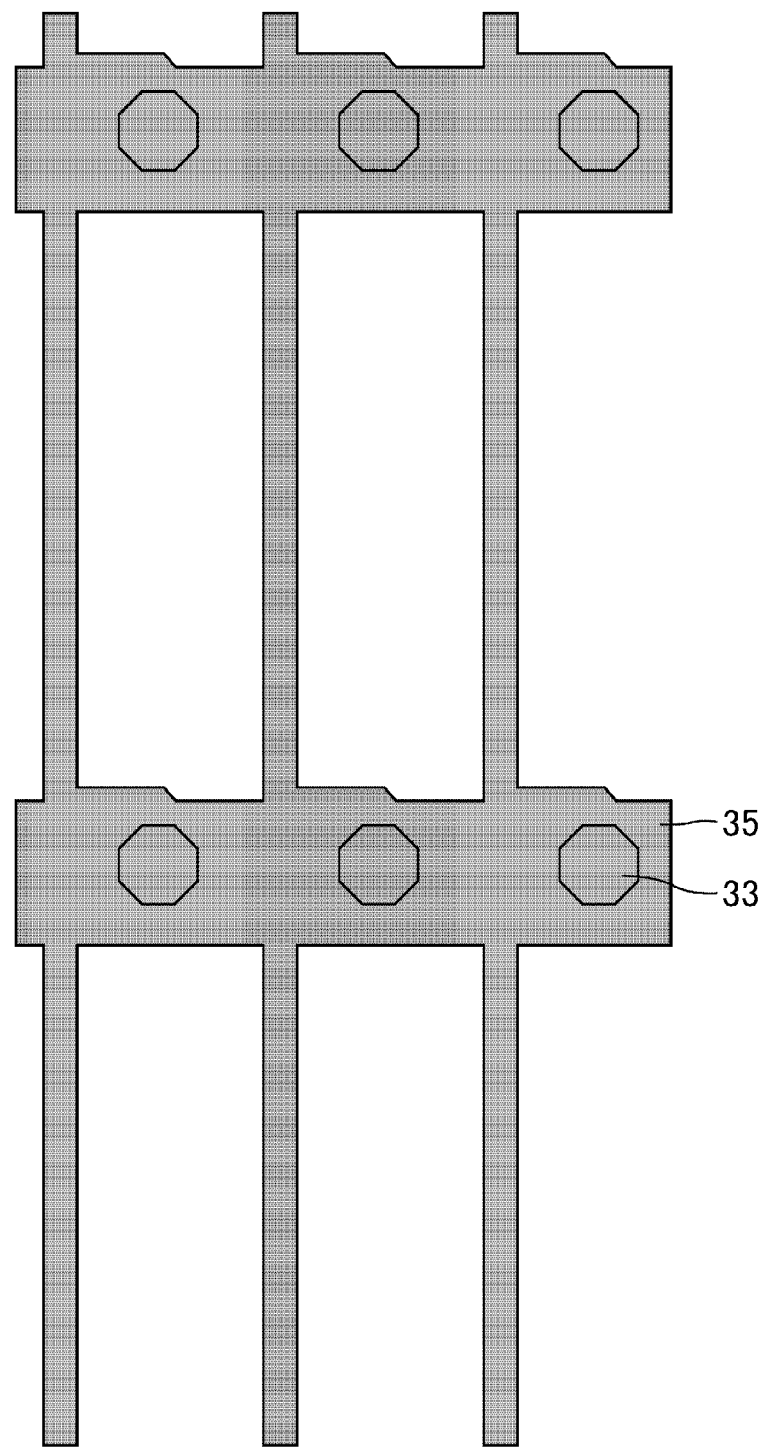
FIG. 20 is a schematic plan view showing a black matrix (BM) and rivets of a counter substrate of the liquid crystal display device according to Embodiment 3.
Figure 21:
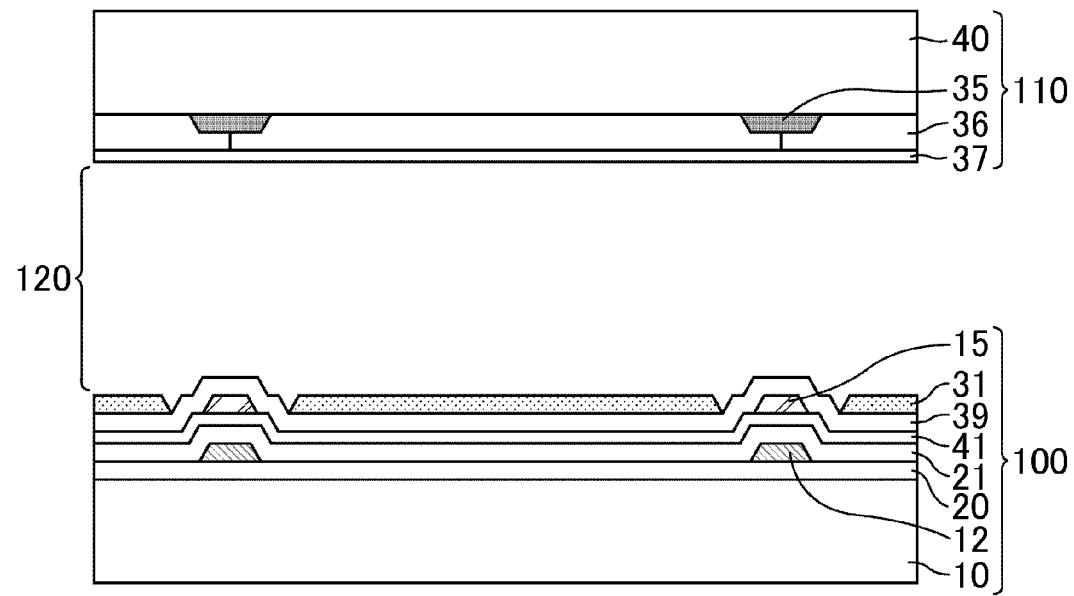
FIG. 21 is a schematic cross-sectional view along the line (G-1)-(G-2) in FIG. 17.
Figure 22:
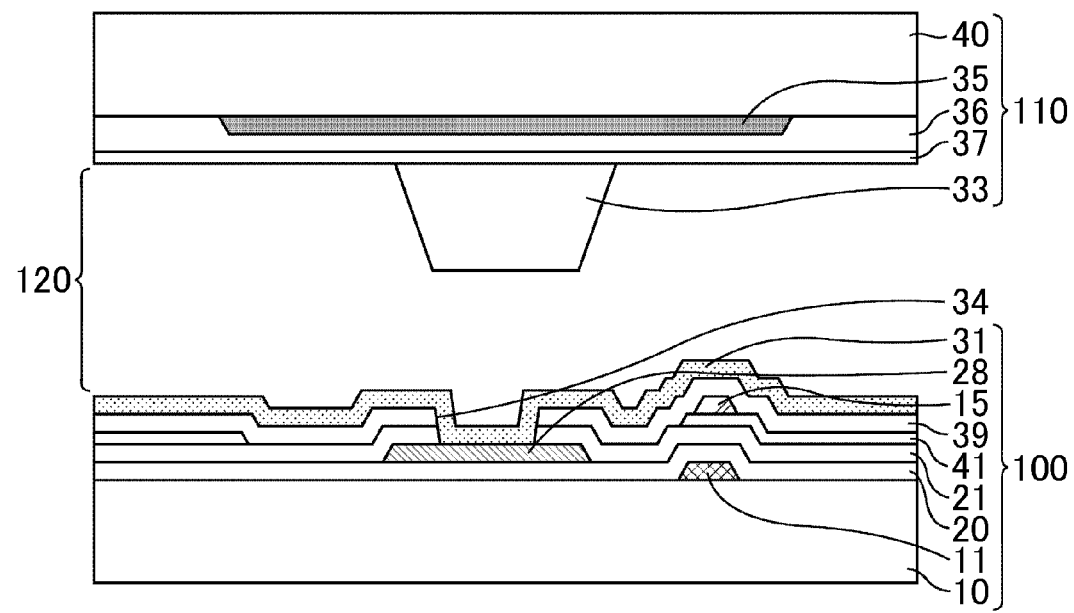
FIG. 22 is a schematic cross-sectional view along the line (H-1)-(H-2) in FIG. 17.

The liquid crystal display device according to Embodiment 3 is described below with reference to FIGS. 17 to 22. FIG. 17 is a schematic plan view showing a structure of a pixel in the liquid crystal display device according to Embodiment 3. FIG. 18 is a schematic plan view of a third conductive layer of the liquid crystal display device according to Embodiment 3. FIG. 19 is a schematic plan view of a transparent conductive layer of an active matrix substrate of the liquid crystal display device according to Embodiment 3. FIG. 20 is a schematic plan view showing a black matrix (BM) and rivets of a counter substrate of the liquid crystal display device according to Embodiment 3. FIG. 21 is a schematic cross-sectional view along the line (G-1)-(G-2) in FIG. 17. FIG. 22 is a schematic cross-sectional view along the line (H-1)-(H-2) in FIG. 17.

As shown in FIGS. 17, 21, and 22, the liquid crystal display device according to Embodiment 3 includes the active matrix substrate 100, a counter substrate 110, and a vertical alignment mode liquid crystal layer 120 sandwiched between the substrates 100 and 110. The liquid crystal layer 120 includes a nematic liquid crystal molecule having negative dielectric constant anisotropy.

In the active matrix substrate 100, the TFT 30 including the gate electrode 25, the source electrode 26, the semiconductor layer 27, and the drain electrode 28 is formed, as shown in FIG. 17. The gate electrode 25 is connected to the gate bus line 11, and the source electrode 26 is connected to the source bus line 12. The drain electrode 28 is connected to the pixel electrode 31. In the third conductive layer, the second electrode portion 15 is formed between adjacent pixels, as shown in FIG. 18. In the transparent conductive layer, the first electrode portion 41 is formed, as shown in FIG. 19. The first electrode portion 41 and the second electrode portion 15 form an auxiliary capacitance electrode. The auxiliary capacitance of each pixel is formed by the pixel electrode 31, the auxiliary capacitance electrode, and an insulating film therebetween. The pixel electrode 31 and the first electrode portion 41 are each formed from a transparent conductive film material such as ITO and IZO, and thus they can form a large auxiliary capacitance without greatly reducing the transmittance.

As shown in FIG. 21, in the cross-section along the line (G-1)-(G-2) in FIG. 17, the active matrix substrate 100 includes the glass substrate 10, the first insulating film 20, the source bus line 12 in the second conductive layer, the second insulating film 21, the first electrode portion 41 in the transparent conductive layer, the second electrode portion 15 in third conductive layer, the third insulating film 39, and the pixel electrode 31 in the stated order. That is, the auxiliary capacitance of the pixel is formed by the pixel electrode 31, the auxiliary capacitance electrode (the first electrode portion 41 and the second electrode portion 15), and the third insulating film 39.

The counter substrate 110 includes a glass substrate 40, a BM 35, a color filter 36, and a counter electrode 37 in the stated order. The alignment of the liquid crystal molecules is controlled by the electric field produced between the pixel electrode 31 and the counted electrode 37.

As shown in FIG. 22, in the cross-section along the line (H-1)-(H-2) in FIG. 17, the active matrix substrate 100 includes the glass substrate 10, the gate bus line 11 in the first conductive layer, the first insulating film 20, the drain electrode 28 in the second conductive layer, the second insulating film 21, the first electrode portion 41 in the transparent conductive layer, the second electrode portion 15 in the third conductive layer, the third insulating film 39, and the pixel electrode 31 in the stated order. In addition, a contact hole 34 is formed in the second insulating film 21 and the third insulating film 39. The drain electrode 28 is connected to the pixel electrode 31 through the contact hole 34.

The counter substrate 110 includes the glass substrate 40, the BM 35, the color filter 36, the counter electrode 37, and a rivet 33 in the stated order. The rivet 33 is a structure to radially align the liquid crystal molecules when voltage is applied.

As in the case of Embodiment 1, the liquid crystal display device according to Embodiment 3 includes the common trunk wiring 4 having a laminated structure including the first to third wiring portions 1 to 3. Thereby, if the width of the common trunk wiring 4 is reduced with miniaturizing of the liquid crystal display panel, the electric resistance is less likely to increase, preventing the display defects such as flicker.

The third conductive layer is formed on the transparent conductive layer in Embodiment 3. Alternatively, the transparent layer may be formed on the third conductive layer.

In Embodiment 3, the CPA mode with a liquid crystal having negative dielectric constant anisotropy and an alignment control structure (rivet) is taken as an example. The structure of Embodiment 3 can be applied to liquid crystal devices of, for example, a vertical alignment (VA) mode other than the CPA mode, a twisted nematic (TN) mode, and the like, as long as it has the transparent Cs structure.

The present application claims priority to Patent Application No. 2011-257805 filed in Japan on Nov. 25, 2011 under the Paris Convention and provisions of national law in a designated State, the entire contents of which are hereby incorporated by reference.

REFERENCE SIGNS LIST

1: first wiring portion
2: second wiring portion
3: third wiring portion
4: common trunk wiring
5: common signal input terminal
6: FPC mounting portion
7: driver mounting portion
8: display region
9: common electrode
10, 40: glass substrate
11: gate bus line
12: source bus line
13: gate bus line lead-out wiring
14: source bus line lead-out wiring
15: second electrode portion
16, 17, 18, 19: contact hole
20: first insulating film
21: second insulating film
25: gate electrode
26: source electrode
27: semiconductor layer
28: drain electrode
30: TFT
31: pixel electrode
32: slit
33: rivet
34: contact hole
35: BM
36: color filter
37: counter electrode
39: third insulating film
41, 50: first electrode portion
45, 46: connecting terminal
47: second source bus line portion
48: first source bus line portion
100: active matrix substrate
110: counter substrate
120: liquid crystal layer

The invention claimed is:

1. A liquid crystal display device, comprising an active matrix substrate and a plurality of pixels in a display region, the active matrix substrate comprising:
a laminated structure including a plurality of conductive layers;
an electrode to supply a common signal to the pixels; and
a wiring outside the display region and connected to the electrode, wherein
the conductive layers include a first conductive layer, a second conductive layer on the first conductive layer, a third conductive layer on the second conductive layer, and a transparent conductive layer,
the electrode includes a first electrode portion in the transparent conductive layer,
the wiring includes a first wiring portion, a second wiring portion, and a third wiring portion facing the first wiring portion and the second wiring portion,
the first wiring portion, the second wiring portion, and the third wiring portion are in the first conductive layer, the second conductive layer, and the third conductive layer, respectively, and
the first wiring portion is connected to the second wiring portion through the third wiring portion.

2. The liquid crystal display device according to claim 1, wherein the transparent conductive layer and the third conductive layer are adjacent to each other.

3. The liquid crystal display device according to claim 2, wherein the wiring is connected to the electrode as a result of contact between the third wiring portion and the first electrode portion.

4. The liquid crystal display device according to claim 2, wherein
the electrode further includes a second electrode portion between adjacent pixels, and
the second electrode portion is in the third conductive layer and connected to the third wiring portion.

5. The liquid crystal display device according to claim 1, wherein the third conductive layer has a sheet resistance less than that of the transparent conductive layer.

6. A liquid crystal display device, including an active matrix substrate and a plurality of pixels in a display region, the active matrix substrate comprising:
a laminated structure including a plurality of conductive layers;
an electrode to supply a common signal to the pixels; and
a wiring outside the display region and connected to the electrode, wherein
the conductive layers include a first conductive layer, a second conductive layer on the first conductive layer, a third conductive layer on the second conductive layer, and a transparent conductive layer,
the electrode includes a first electrode portion in the transparent conductive layer,
the wiring includes at least one of a first wiring portion and a second wiring portion, and a third wiring portion facing the at least one of the first wiring portion and the second wiring portion,
the first wiring portion, the second wiring portion, and the third wiring portion are in the first conductive layer, the second conductive layer, and the third conductive layer, respectively,
the active matrix substrate further includes a first insulating film between the first conductive layer and the second conductive layer, and a second insulating film between the second conductive layer and the third conductive layer,
and
the third wiring portion contacts the first wiring portion through a contact hole penetrating the first insulating film and the second insulating film.

7. The liquid crystal display device according to claim 6, wherein the third wiring portion contacts the second wiring portion through a contact hole penetrating the second insulating film.

8. The liquid crystal display device according to claim 6, wherein
the active matrix substrate further comprises a gate bus line and a source bus line both in the display region, and a lead-out wiring outside the display region and connected to the gate bus line or the source bus line,
the lead-out wiring intersects the wiring, and
the wiring is constricted at an intersection of the wiring and the lead-out wiring.

9. The liquid crystal display device according to claim 8, wherein
the lead-out wiring is in the first conductive layer, and
the second wiring portion is constricted at an intersection of the second wiring portion and the lead-out wiring.

10. The liquid crystal display device according to claim 8, wherein
the lead-out wiring is in the second conductive layer, and
at least one of the first wiring portion and the third wiring portion is constricted at an intersection of the at least one of the first wiring portion and the third wiring portion and the lead-out wiring.

11. The liquid crystal display device according to claim 10, wherein
a value calculated by dividing a relative permittivity of the second insulating film by a film thickness of the second insulating film is larger than a value calculated by dividing a relative permittivity of the first insulating film by a film thickness of the first insulating film, and
the third wiring portion is constricted at an intersection of the third wiring portion and the lead-out wiring.

12. The liquid crystal display device according to claim 10, wherein
a value calculated by dividing a relative permittivity of the second insulating film by a film thickness of the second insulating film is smaller than a value calculated by dividing a relative permittivity of the first insulating film by a film thickness of the first insulating film, and
the first wiring portion is constricted at an intersection of the first wiring portion and the lead-out wiring.

13. The liquid crystal display device according to claim 1, wherein
the electrode is a common electrode,
the active matrix substrate further comprises a pixel electrode,
the common electrode includes a plurality of linear parts spaced apart from one another in each pixel, and
the pixel electrode faces the space between the linear parts.

* * * * *